INVENTOR
LUTHER H. HAIBT

BY John E. Dougherty Jr.
ATTORNEY

Aug. 3, 1965 L. H. HAIBT 3,199,082

MEMORY SYSTEM

Filed Nov. 27, 1959 12 Sheets-Sheet 6

Aug. 3, 1965

L. H. HAIBT 3,199,082

MEMORY SYSTEM

Filed Nov. 27, 1959

12 Sheets-Sheet 7

Aug. 3, 1965 L. H. HAIBT 3,199,082

MEMORY SYSTEM

Filed Nov. 27, 1959 12 Sheets-Sheet 10

United States Patent Office 3,199,082

Patented Aug. 3, 1965

3,199,082

MEMORY SYSTEM

Luther H. Haibt, Croton-on-Hudson, N.Y., assignor to International Business Machines Corporation, New York, N.Y., a corporation of New York Filed Nov. 27, 1959, Ser. No. 855,627
13 Claims. (Cl. 340—172.5)

The present invention relates to a memory system and, more particularly, to a memory system employing a counter for providing a continuous manifestation of the contents of the memory and/or controlling the response to the memory during functional operations performed on the memory.

Many large scale computer systems now in commercial use include memories which are made up of large numbers of storage devices capable of assuming different stable states representative of different information values. Such memories are usually addressed for functional operations such as read, write and erase, by coincidently energizing a selected address line in each of a number of groups of address lines for the memory. Different combinations of address lines define different storage locations in the memory. Therefore, when a word of information has been entered in such a memory and it is desired to read out that word, the particular combination of lines defining the storage location of the word must be known in order to properly address the memory. This type of memory operation is exemplified by the well known two and three dimensional core memories in which the cores are addressed by coincident currents applied to X and Y, or to X, Y and Z groups of address lines for the memory. More recently, memories have been developed in which not only the information words are stored but also associated with each information word, or forming part of the word, a group of information values, termed an identifying tag, is also stored. In memories of this type wherein both words of information and their identifying tags are stored in the memory, the identifying tags are the address mechanism by which the locations of the words may be found.

In accordance with the principles of the subject invention, an improved memory system is provided which includes a memory having a plurality of bistable storage devices and a counter. The counter is operated in conjunction with and according to the functional operations performed on the memory, in order to ensure that all of the locations in the memory are efficiently used, and also to control the response of the memory during these functional operations in accordance with the contents of the memory and the functional operations previously performed on the memory. The principles of this invention are disclosed in this application as structurally embodied in a memory system of what is termed the associative type, that is, a memory system, such as described above, wherein with each word of information stored in the memory, an identifying tag for the word is also stored. The associative memory is addressed to either read out or erase any particular word of information stored in the memory by comparing the identifying tags for all of the words already stored in the memory with the identifying tag for the word on which the operation is to be performed. The counter is used both to continuously provide a manifestation of the contents of the memory and also to locate an empty storage location in the memory whenever it is desired to enter a new word in the memory.

Initially, the memory is conditioned for operation by resetting the counter and transferring the reset value of the counter, as a vacancy tag, that is, a tag designating an empty location in the memory, to a particular storage location in the memory. Thereafter, the value of the counter is repeatedly increased and each increased value is transferred as a vacancy tag to a different storage location in the memory until each storage location in the memory is storing a different vacancy tag. At this time, the value of the counter corresponds to the value of the highest vacancy tag stored in the memory, and this value represents the number of storage locations in the memory. During each write operation in the memory, the value stored in the counter is compared with the vacancy tags previously assigned by the counter to the memory and, in this way, a vacant location in the memory is located in which the new word of information is then written. After the memory location has been selected for the writing operation, the value in the counter is decreased by one. During each erase operation in the memory, the value in the counter is first increased by one and then this increased value is assigned as a vacancy tag to the storage location in the memory on which the erase operation is performed.

By operating the counter in this way, that is, by increasing the value in the counter each time a word is erased from the memory, and decreasing the value in the counter each time a word is written in the memory, the value in the counter always corresponds to the number of empty storage locations in the memory. When there are no empty storage locations in the memory, the value in the counter indicates that the memory is full. All of the functional operations to read, write and erase in the memory are controlled by comparison operations performed either under the control of the value in the counter as a vacancy tag, or under the control of an identifying tag for a word. Each tag entered in the memory includes a bit designating it as either a vacancy tag or an identifying tag so that both vacancy and identifying tags may be stored randomly in the memory and the counter continuously provides a means of controlling operations so that all word locations in the memory are efficiently used, without there being any danger of inadvertently destroying information stored in the memory by attempting to write a new word of information into a location which is already storing a word.

Therefore, it is an object of the present invention to provide an improved memory system including a memory and a counter which is operated in conjunction with the memory.

Another object is to provide an improved memory system including a memory and a counter which is operated in conjunction with the memory, wherein the value in the counter is decreased each time a new word of information is entered in the memory and is increased each time a word previously written is erased from the memory so that the counter provides a continuous manifestation of the contents of the memory.

Still another object is to provide a memory of the above described type wherein the values developed by the counter are transferred to empty storage locations in the memory as vacancy tags to designate these locations as being empty and, thereafter, these locations are located for subsequent writing operations by comparing the value then stored in the counter with the vacancy tags previously transferred from the counter into the memory.

Still another object is to provide an improved memory of the associative type which includes a counter operated in conjunction with the memory to locate empty locations in the memory in which new words of information are written.

Still another object is to provide a memory system including a memory and means for controlling functional operations in the memory including a counter capable of storing a value which is increased or decreased during certain functional operations performed on the memory according to the operations performed.

A further object is to provide a memory system including a memory and counter operated in conjunction with the memory wherein the value of the counter is increased or decreased during certain functional operations on the memory and the response of the memory during certain functional operations is controllable by the value then in the counter.

A further object is to provide a memory system of the associative type wherein tags on which comparisons are made to effect control of memory operations are transferred to the memory from a plurality of different input sources or registers, one of which may be a counter, and each tag entered in the memory includes a bit designating the source from which it came which serves to distinguish it from tags transferred from other sources during comparison operations subsequently performed on the memory.

The foregoing and other objects, features and advantages of the invention will be apparent from the following more particular description of the preferred embodiments of the invention, as illustrated in the accompanying drawings.

In the drawings:

FIG. 6 shows the manner in which

Figure 6A:
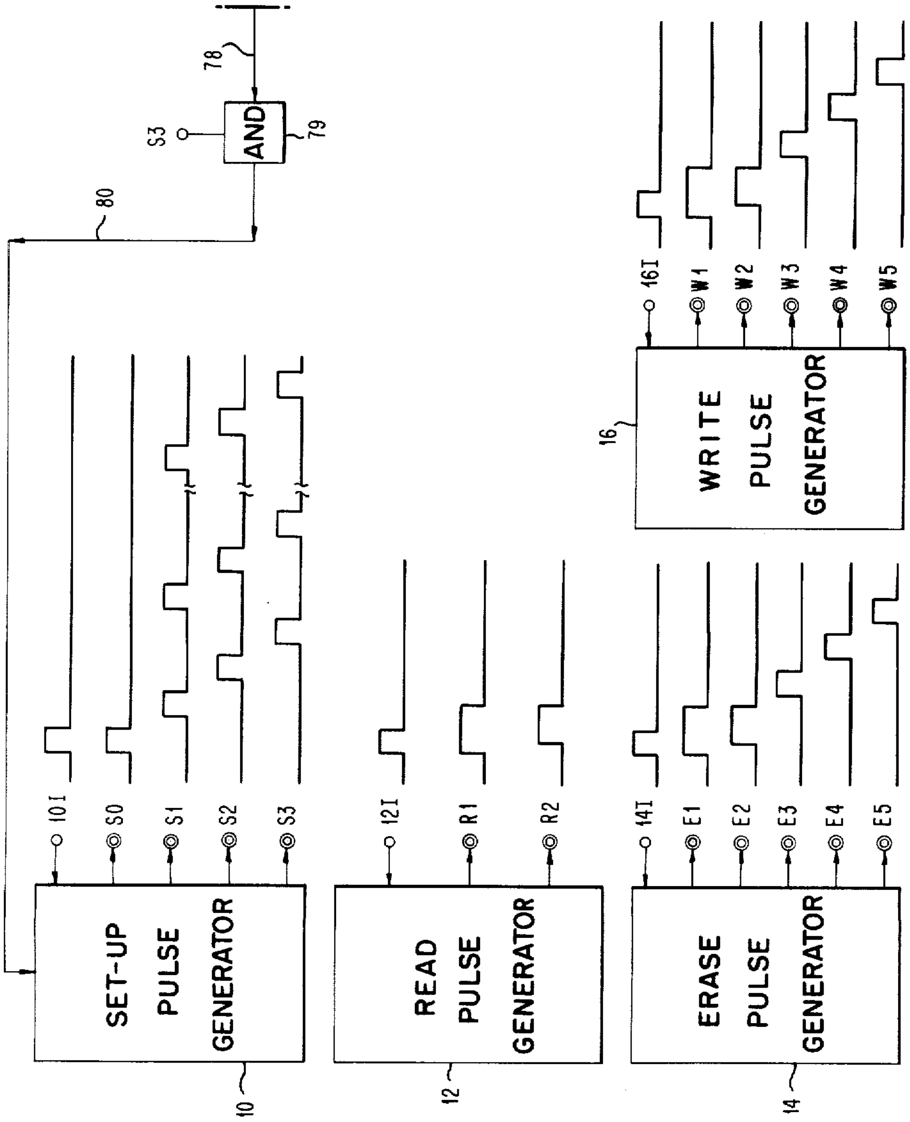
FIGS. 6A–6H are arranged to provide a wiring diagram of applicant's novel system.
Figure 6:
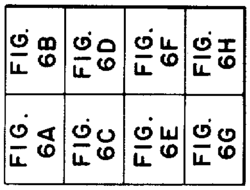

FIGS. 6A–6H taken together as shown in FIG. 6 constitute a wiring diagram of applicant's system.

*General description*

In order to facilitate the explantion of the principles of applicant's invention, it is believed advisable to first undertake a general description of applicant's system, as well as the mode in which it is operated.

This general description is directed primarily to the functions achieved by the system and the various steps performed in achieving these functions. Therefore, this portion of the application is limited to a statement of what functions are accomplished by the various components making up the system as operated in a particular mode and the detailed description of the structures of the components and interconnecting circuitry is left for the latter portion of the application.

Figure 1:
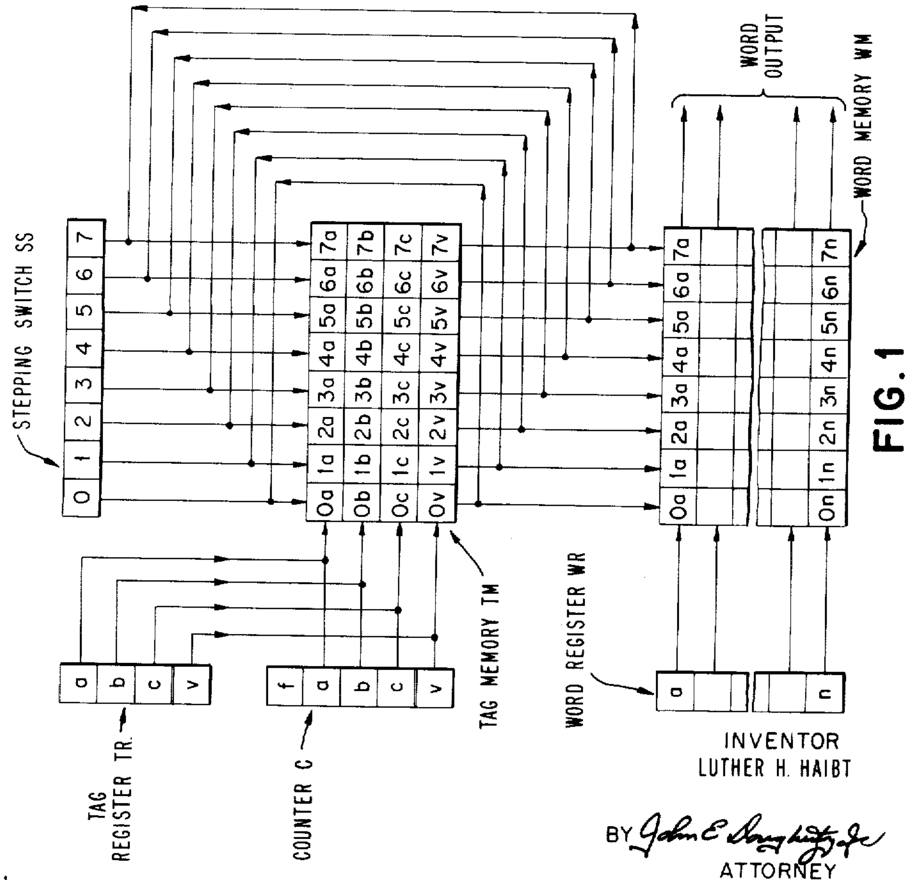
FIG. 1 is a block diagram representation of applicant's novel memory system.

FIG. 1 shows in block diagram form the basic components of the system and illustrates the paths of information transfer between these components. These components are, as shown in FIG. 1, a tag memory TM, a word memory WM, a stepping switch SS, a tag register TR, a word register WR, and a counter C. As has been pointed out in the introductory remarks, the disclosed system is what is usually termed an associative memory system and has the characteristic that it is addressed to perform read, write and erase operations by comparing an address value with address values stored in the memory. These address values are usually termed tags and may, as in the illustrative embodiment shown, be stored in a specific section of the memory identified as a tag memory which is operated separately from the word memory, or the tag and word memories may be incorporated into a single memory and the address tag may be compared with a selected portion of each of the words stored in the memory.

There are four basic operations in applicant's system. These are a set up operation, a write operation, an erase operation, and a read operation. These four operations are described below with reference to FIGS. 1, 2A–2K, 3A–3C, 4A–4C, 5A–5F, but prior to the functional description of these four operations, the characteristics and functional capabilities of each of the principal components shown in FIG. 1 are described.

*Tag register TR.*—The tag register is a conventional register and includes four bistable storage devices represented symbolically by the blocks *a, b, c,* and *v*. The function of this register is to receive identifying tags which are used to either control a read or erase operation or are themselves to be written in the tag memory. Though the register is a four position register, the lowermost position in the register is always in its binary zero state and the actual values of identifying tags are stored in the *a, b,* and *c* positions of the register. When an identifying tag entered in this register is employed during a read, write or erase operation, all four bits stored in the register are used. The function of the zero stored in the "*v*" position is to designate the tags from the tag registers as actual identifying tags in contradistinction to vacancy tags which, as will be described below, are provided by another register in the form of counter C and serve to control the writing of new identifying tags and their associated words in vacant positions in the memory.

*Word register WR.*—The word register WR is also of conventional design and includes a number of bistable devices represented symbolically by the small blocks. The break lines shown in FIG. 1 indicate that there may be any number of storage positions in this register and, in most cases, there are many more storage positions in the word register than in the tag register. The word register receives words to be stored in the word memory and, during write operations, the word stored in the word register is transferred to the addressed column of the word memory.

*Counter C.*—The counter C is shown in FIG. 1 and includes five bistable storage devices designated *f, a, b, c,* and *d*. These counter storage devices form a register capable of storing a value which may be selectively either increased or decreased by one each time a signal is applied to the counter. The primary function of the counter is to locate vacant columns in the memory in which new information may be written. In order to perform this function, the counter C is actuated during the initial set up operation to assign vacancy tags to each of the eight columns of the tag memory, and is similarly actuated during each erase operation to assign a vacancy tag to the column from which information was erased. The "*c*" position of the counter is actually its low order location. The "*v*" position of the counter always remains in the binary one state so that each time a value stored in the counter is entered in a column of the tag memory the storage device for the "*v*" location in that column is set to its binary one state indicating that that column is now storing a vacancy tag. The uppermost storage location of the counter C, which location is designated "*f*" is not coupled to the tag memory. This position of the counter is provided in order that an indication may be obtained when the tag memory is full, that is, when each column is storing an identifying tag in which case the "*f*" position of the counter is in its binary zero state. Whenever there are one or more vacant columns in the memory, that is, columns in which no identifying tag is then stored, the "*f*" position of counter C is in its binary one state.

Briefly, the following functions are performed by the counter C. During the set up operation, it assigns vacancy tags to each of the columns in the tag memory. During each write operation the value stored in the counter C is compared with the values stored in the tag memory to locate the proper vacant column in which the new identifying tag should be written. After this has been accomplished, the value stored in the counter is decreased by one so that it will be effective to locate the next vacant column during the next write operation. During each erase operation, that is, when an identifying tag is erased from a column of the tag memory, the counter C is first increased by one and then the increased value of the counter is stored in the column of the tag memory in which the erase operation was performed. The counter C performs no function during a read operation. Since the counter is stepped up each time a new vacancy is created in the tag memory and stepped down each time a new identifying tag is written in a vacant column, it provides a continuous indication of how many vacant columns are present in the memory.

*Stepping switch SS.*—The stepping switch SS includes eight storage positions each consisting of a bistable storage device. The stepping switch operates like a closed ring circuit in that all of the positions of the stepping switch but one position are always in the binary zero state. The binary one stored in this position may be stepped from left to right by applying an advance pulse to the stepping switch. When the binary one is stored in the last position of the stepping switch, an advance pulse causes the one to be transferred back to the zero position of the switch. The stepping switch is employed only during the set up operation at which time it successively conditions the storage devices of the columns of the tag memory so that the vacancy tags developed by the counter C are written in different columns of the tag memory.

*Tag memory TM.*—The tag memory includes eight vertical columns (designated 0–7) and four horizontal rows (designated *a*, *b*, *c*, and *v*) of bistable storage devices. Each of these storage devices is identified in FIG. 1 with the numeral and letter specifying its location by column and row in the tag memory. In operation, each tag which is stored in the tag memory is stored in one of these vertical columns. Thus, each tag includes four binary orders or bits of information. The bits stored in the lowermost positions of the tag memory, represented by the blocks 0*v*–7*v*, are what are termed vacancy bits and their purpose, in the embodiment of the invention herein described, is to indicate whether the other three storage positions in the corresponding columns are actually storing an identifying tag or a vacancy tag. When an identifying tag is stored in any particular column, the "*v*" position of that column is in the binary zero state. When a vacancy tag is stored, the vacancy bit storage device for the column is in its binary one state. The tag memory has the capability of being addressed by comparing an identifying tag stored in the tag register TR, or a vacancy tag stored in the counter C with all of the tags stored in the tag memory. An indication is provided for the column wherein a comparison is achieved, and this indication may be utilized to control read, write or erase operations in that column. The various columns of the tag memory may also be addressed for functional operations under the control of the stepping switch SS which includes eight bistable storage devices each connected to a corresponding column of the tag memory. The stepping switch serves to address the columns of the tag memory during the set up operation.

*Word memory WM.*—The word memory includes eight columns of storage devices each corresponding to one column of the tag memory. The number of storage positions in each column of the word memory is usually greater than the number of storage devices in the corresponding column of the tag memory. The columns of the word memory are addressed for reading, writing and erasing information under the control of signals developed during compare operations performed on the tag memory. Once addressed, the desired functional operation is performed in the word memory by applying appropriate pulses to the vertical and horizontal drive lines for this memory. The words to be stored in the word memory are initially stored in the word register WR and are transferred into the appropriate column of the word memory, the column being selected by a comparison operation performed on the tag memory.

Figure 2A:
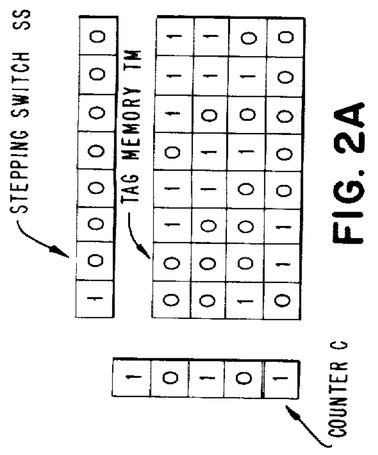
FIGS. 2A–2K are block diagram representations illustrating the manner in which certain of the components of applicant's system are operated upon during a set up operation.

*Set up operation.*—The purpose of the set up operation is to prepare the various components for the functional operations which are to be performed by the system. The steps performed during the set up operation are illustrated in FIGS. 2A–2K and, in each of these figures, the three components which are affected during the operation are shown. These components are the counter C, the tag memory TM, and the stepping switch SS. FIG. 2A shows these components prior to the set up operation and, in this figure, values have been randomly assigned to the various bistable devices which form the components in order to illustrate that the same result is achieved by a set up operation regardless of the condition of the stepping switch SS, counter C and tag memory TM prior to the initiation of the operation. In order to provide a more graphic illustration of the operational steps performed during the set up operation, the particular ones of the bistable devices which are acted upon during each step of the operation are shaded in the figures.

The object of the set up operation is to assign vacancy tags to each of the columns of the memory and also to set the counter C to the proper value so that it will be thereafter effective to properly control the operation of the memory. Before this can be done it is first necessary to reset both the counter C and the stepping switch SS to the condition shown in FIG. 2B. The counter C is reset to a condition with a zero in its high order position and ones in each of the remaining positions. The stepping switch is reset to a condition with a binary one stored in its last position (corresponding to column 7) and zeros in all of the other positions. It should be reiterated that the lowermost or "*v*" position of the counter C is not a true counter position and there is no change in state in this position when the counter is operated. After the counter and stepping switch have been reset to the condition of FIG. 2B, the task of assigning vacancy tags to the columns of the tag memory is begun. Three steps are required for each such assignment and these steps are:

(1) Add one to counter C, and advance stepping switch SS;
(2) Clear a column of the tag memory under the control of the binary one stored in the stepping switch;
(3) Transfer the value in the counter into the column of the tag memory just cleared.

Figure 2B:
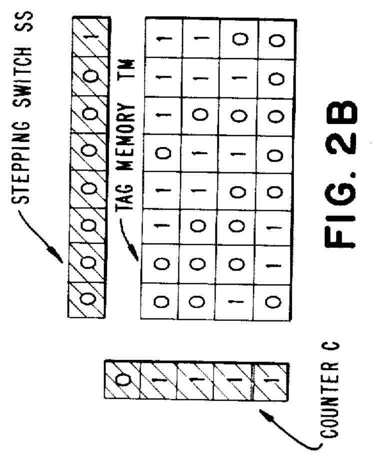
Figures 2C, 2D, 2E, 2F, 2G, 2H, 2I, 2J, 2K:
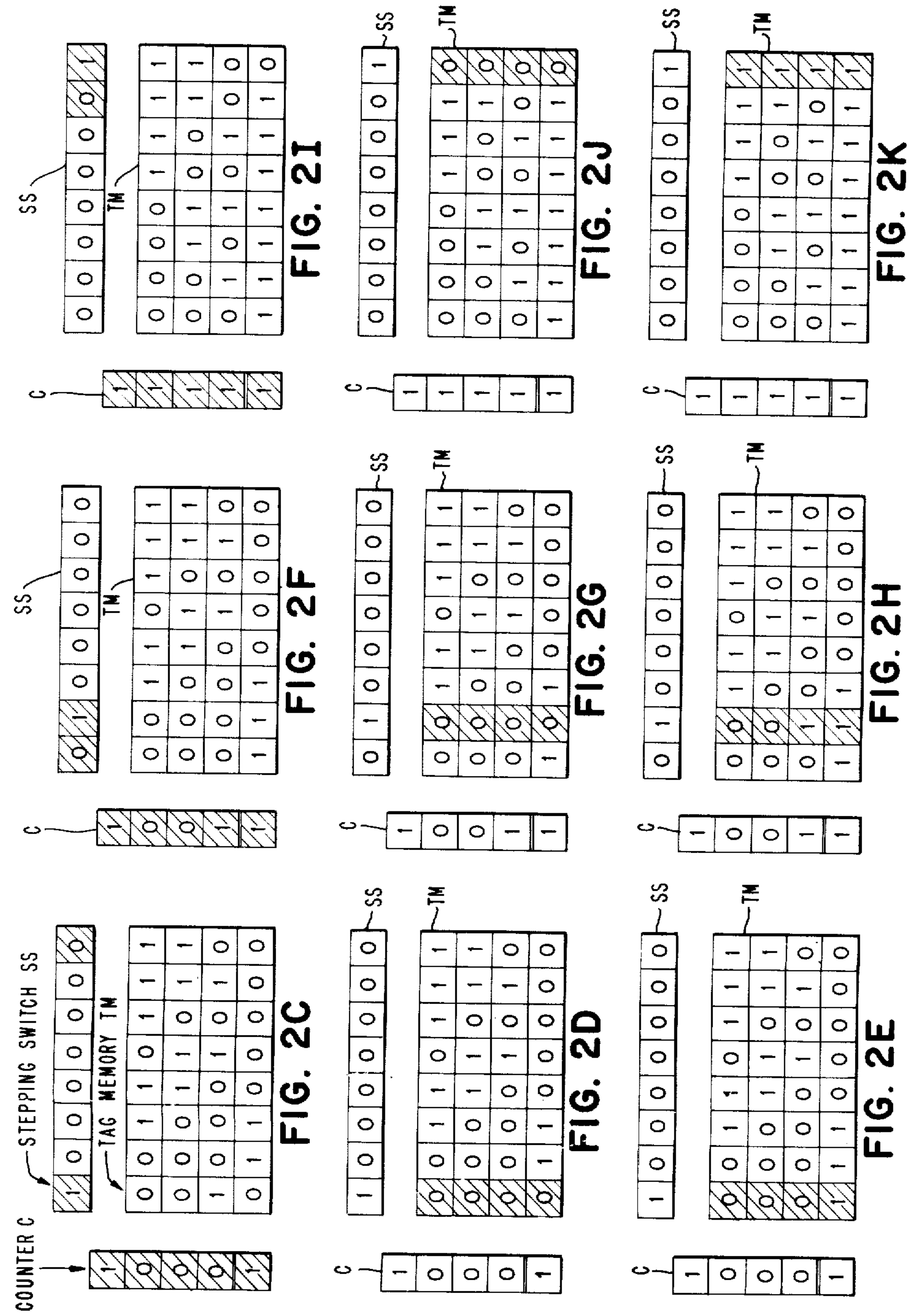

FIGS. 2C, 2D, and 2E illustrate the performances of these three steps to assign a vacancy tag to the "0" column of the tag memory. As shown in FIG. 2C, the addition of the one to the low order or "*c*" position of counter C causes the counter to be set to a value of 1000–1 (this type of representation in accordance with which the vacancy bit is separated from the tag by a dash will hereafter be employed). The advance of the stepping switch SS causes a one to be set in its column 0 position. During the second step of the operation, as is indicated in FIG. 2D, column 0 of the tag memory is reset to zero under the control of the one stored in the corresponding position of stepping switch SS. During the third step of the operation, as is indicated in FIG. 2E, the value stored in the *a*, *b*, *c*, and *v* positions of the counter C, that is 000–1, is transferred into column 0 of the tag memory, again under control of the one in the corresponding location of stepping switch SS.

The three steps of FIGS. 2C, 2D, and 2E are thereafter repeated to successively transfer successively greater values developed in the counter C into the columns of the tag memory TM. FIGS. 2F, 2G and 2H illustrate the result of performing the series of three steps for the second time to assign a vacancy tag of 001–1 to column 1 of the tag memory. This series of steps is performed six more times to assign vacancy tags to the six remaining columns of the tag memory. FIGS. 2I, 2J, and 2K illustrate the last three steps by which the value 111–1 is assigned to the column 8 of the tag memory.

Thus, upon completion of the set up operation, it can be seen that successively greater values have been assigned to the columns of the tag memory going from left to right. The "v" position for each column is in the binary one state indicating that that column is now storing a vacancy tag. Finally, the counter C is now set at a value of 111–1 indicating that vacancy tags are stored in each of the columns of the tag memory. It should be noted that the counter C, in its *a*, *b*, and *c* positions, is storing a value which corresponds to the highest value of a vacancy tag stored in the tag memory. Further note should be made of the fact that the bisable devices of the word memory are not reset during the set up operation. Resetting of the word memory is not necessary at this time, since, as will be pointed out in detail below, each column of the word memory in which a new word is to be written is reset during the write operation immediately prior to the actual writing of the word in that column of the word memory.

Figure 3A:
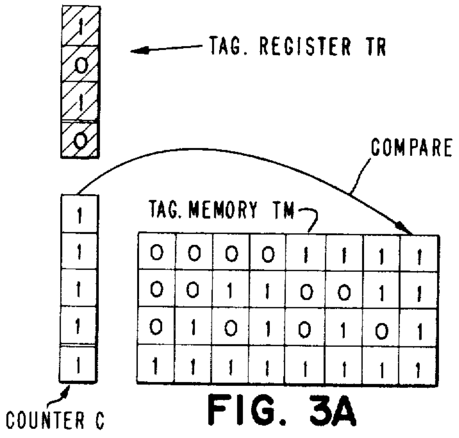
FIGS. 3A–3C are block diagram representations illustrating the manner in which certain of the components of applicant's system are operated upon during a write operation.
Figure 3B:
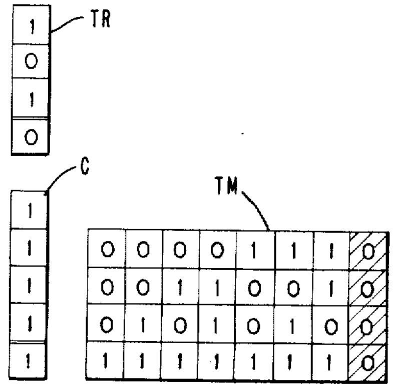
Figure 3C:
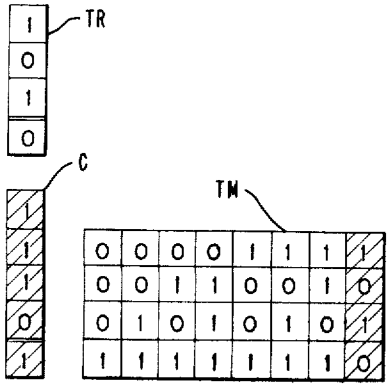

*Write operation.*—The steps necessary to perform a write operation are illustrated in FIGS. 3A, 3B and 3C wherein the tag register TR, the counter C, and the tag memory TM are shown. In FIG. 3A, the condition of the counter C and the tag memory TM is the same as shown in FIG. 2K at the end of the set up operation. The value 101–0 has been entered in the tag register TR. It is this identifying tag, together with an associated word which is entered in the word register WR, which are to be written in the memory. It is again noted that whenever an identifying tag is to be so written in the tag memory, a zero is entered in the "v" position of the tag register TR and from this register into the "v" position of the column of the tag memory TM in which the tag is written to indicate the presence of an identifying tag in that column.

There are three successive steps in the write operation which are as follows:

(1) The value stored in the *a*, *b*, *c*, and *v* positions of counter C is compared with the values stored in the tag memory TM.
(2) The column of the tag memory on which a comparison is achieved and the corresponding column in the word memory are reset to zero.
(3) The tag in the tag register and the word in the word register are written in the column of the memory just reset; and the counter C is decreased by one.

During the first step of the write operation under consideration, as is shown in FIG. 3A, the value 111–1 stored in counter C compares with the value 111–1 stored in the column 7 of the tag memory TM. During the next step, as is indicated in FIG. 3B, each of the bistable devices of this column is set to its binary zero condition and, though not shown here, the bistable devices in the corresponding column of the word memory are also reset to zero. After this has been accomplished, the third step is performed, during which, as is shown in FIG. 3C, the value 101–0 stored in tag register TR is written in column 7 of the tag memory; the counter C is decreased to 1110–1; and, though not shown in these figures, the word stored in the word register WR is transferred to column 7 of the word memory WM (see FIG. 1).

During each write operation the same steps are performed, that is, first the value stored in the counter is compared with the values stored in the tag memory to locate the proper vacant column in which the new information is to be written. That column of the tag memory is reset and then the new information stored in the tag and word registers is written in the column just reset. During the last operation, the value stored in the counter C is stepped down by one so that it again is set at a value corresponding to the highest vacancy tag then present in the tag memory.

Figure 4A:
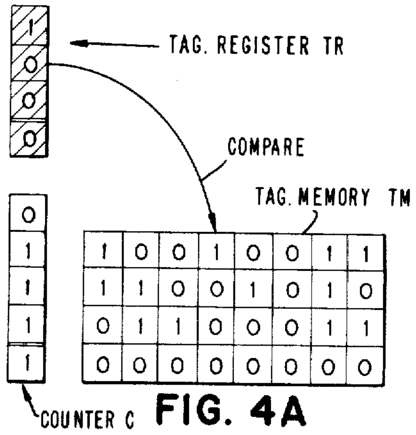
FIGS. 4A–4C are block diagram representations illustrating the manner in which certain of the components of applicant's system are operated upon during an erase operation.

FIG. 4A shows the condition of the tag memory TM and counter C after seven more write operations, similar to that illustrated by FIGS. 3A, 3B, and 3C, have been performed. During these write operations, the values 111–0; 000–0; 010–0; 100–0; 001–0; 110–0 are successively entered in the tag register and from there transferred into the appropriate columns of the tag memory under control of the counter C. There are thus eight tags stored in the tag register and a zero stored in each of the "v" positions of the tag memory so that the tag memory is now full. An indication of the fact that the tag memory is full is provided by the uppermost or "f" position of counter C which is now, for the first time since completion of the set up operation, in its binary zero condition.

Figure 4B:
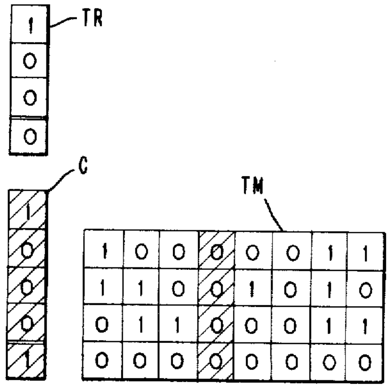
Figure 4C:
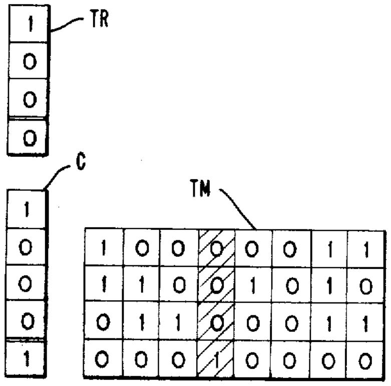

*Erase operation.*—FIGS. 4A, 4B, and 4C illustrate the steps performed during an erase operation. The value 100–0 corresponding to the tag, which, with its associated word, is to be erased, is entered in the tag register TR.

The principal steps in an erase operation are as follows:

(1) The tag in the tag register is compared with the tags stored in the tag memory to locate the column in which it is stored.
(2) The column of the tag memory on which a comparison is achieved is reset to zero; and the counter C is increased by one.
(3) The increased value in the counter is written in the column of the tag memory which was just reset.

The results of performing these successive steps are illustrated in FIGS. 4A, 4B, and 4C. Upon completion of the operation the components are in the condition shown in FIG. 4C with column 3 of the tag memory, which had been storing the identifying tag 100–0, now storing the vacancy tag 000–1. The counter C is set at 1000–1, the one in the high order position indicating that there is a vacancy present in the memory and the value 000 of counter positions *a*, *b*, and *c* matching the values of the highest vacancy tag present in the tag memory, which is here the only vacancy tag. Note should be made of the fact that the word memory is not reset during an erase operation. The necessity of resetting this position of the memory at this time is obviated by the fact that with a vacancy tag, including a zero in its "v" position, stored in the corresponding column of the tag memory, no comparison can be achieved on this column except during a write operation, when the stored tags are compared with the value in counter C. During all other operations, that is, erase and read, comparison is based upon the value stored in the tag register which always has a zero in its "v" position. During a write operation, the entire column selected for writing under control of counter C is reset to zero prior to writing new information. Thus, though column 3 of the word memory is actually storing a word upon completion of the erase operation of FIGS. 4A, 4B, and 4C, from an operational standpoint, the word actually stored has been effectively erased by the presence of the vacancy tag in column 3 of the tag memory.

Figure 5A:
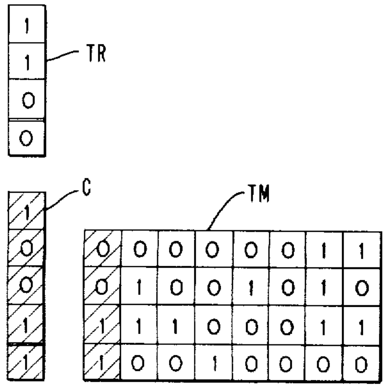
FIGS. 5A–5F are block diagram representations illustrating the manner in which certain of the components of applicant's system are operated upon during alternately performed erase and write operations.
Figure 5D:
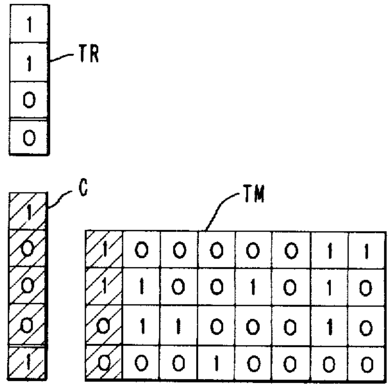
Figure 5B:
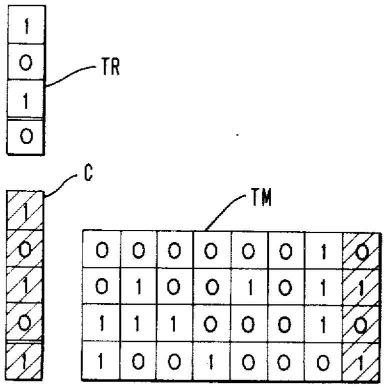
Figure 5E:
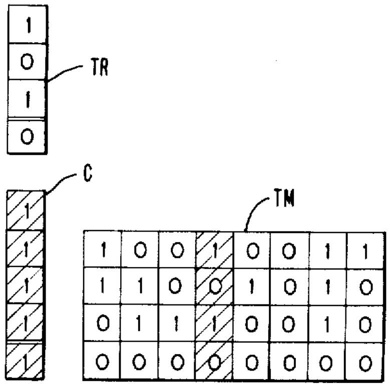
Figure 5C:
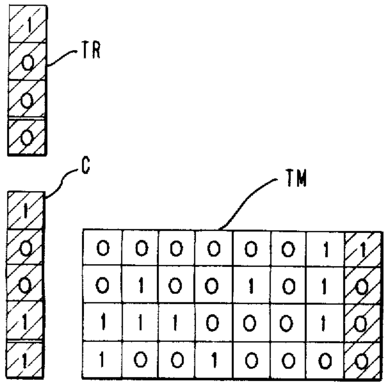
Figure 5F:
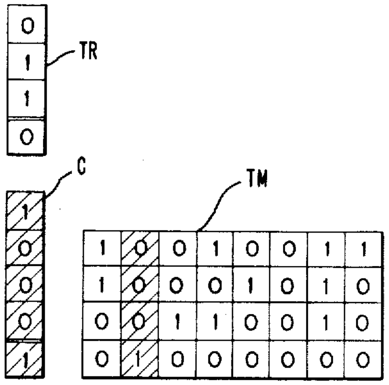

*Alternate erase and write operations.*—FIGS. 5A–5F illustrate the performance of the system during alternate write and erase operations. The starting point for the operations here depicted is the state of the system shown in FIG. 4C. FIG. 5A indicates the result of erasing the identifying tag 110–0 from the tag memory. FIG. 5B illustrates how the components are affected by erasing the tag 101–0 from the memory. FIG. 5C illustrates the result of writing the tag 100–0 in the memory. Referring to FIGS. 5B and 5C, it can be seen that the new tag 100–0 written during the operation of FIG. 5C is entered in column 7 of the tag memory which is the column vacated during the last erase operation. This is so even though there are two other columns in the memory which are at that time vacant, that is column 0 and column 3. FIG. 5D illustrates the operation when the value 110–0 is written in the tag memory, this value being written into column 0 of the tag memory under the control of the counter C. FIG. 5E depicts the operation to write the tag 101–0 in the memory and this value is written in the column 3 of the memory since this is then the only vacant column. It should be noted here that, upon completion of the write operation of FIG. 5E, the memory is again full, as is indicated by the one in the high order "*f*" position of counter C. Finally, FIG. 5F illustrates the change effected by erasing the value 011–0 from column 1 of the memory. It should be again noted that during each of the above described erase operations it is not necessary to reset the word memory to zero.

FIGS. 2A–5F serve to illustrate the function of the counter C, which during all operations keeps track of the empty positions in the tag memory. It should be noted that the vacancy tags, having a zero in their low order or "*v*" position, which are transferred from the counter into the tag memory need not be in any particular order from left to right or right to left in the tag memory. The juxtaposition of these values is illustrated by the operation shown in FIGS. 5A–5F. During each write operation, the counter C controls the memory so that the value entered in the tag register is written in the particular column in the tag memory which was storing the value at which the counter was standing at the start of the write operation. In the course of each write operation a one is subtracted from the low order position of the counter C so that it is in its proper condition for subsequent write and erase operations. During each erase operation the value in the counter C is first increased by one and the increased value is transferred into the column of the tag memory from which a tag is erased. By thus controlling the transfer of tags into the register, and by providing a continuous indication of the number of vacant positions in the tag memory, the counter C allows for efficient and flexible utilization of all of the positions in the tag memory.

*Read operation.*—At any time after the completion of the set up operation, a read operation may be performed. This is initiated by entering in the tag register the identifying tag for the word to be read. This tag is then compared with the tags stored in the tag memory in the same manner as a comparison is achieved for the first step of an erase step operation, as depicted in FIG. 3A. The value stored in the column of the word memory corresponding the column of the tag memory on which a comparison is achieved is then read out of the memory. The read operation is non-destructive. Therefore, there is no necessity of altering the status of the counter C during a read operation. Read operations can be accomplished with the system in any of the conditions depicted in FIGS. 5A–5F, for example. Such operations will in no way effect the subsequent erase and write operations shown in these fifigures. Of course, when the identifying tag entered in the tag register during a read operation does not compare with any of the identifying tags stored in the tag memory, no word is read out of the memory.

*Detailed description*

FIGS. 6A, 6B, 6C, 6D, 6E, 6F, 6G and 6H, arranged as shown in FIG. 6, constitute the system diagram which shows the structural details of the various components of applicant's system, as well as the interconnections between these components. Before taking up the description of the manner in which the various components operate to perform the basic set up, read, write and erase operations, described generally above, the structure of each of the components and the manner in which it is operated in the circuit will be described in detail. Detailed descriptions are included of the basic components shown in FIG. 1, that is, the tag register TR, tag memory TM, word register WR, word memory WM, counter C and stepping switch SS, as well as the various circuits such as the drivers for the tag and word memories which are used to couple these components and effect the transfer of information therebetween.

Figure 6B:
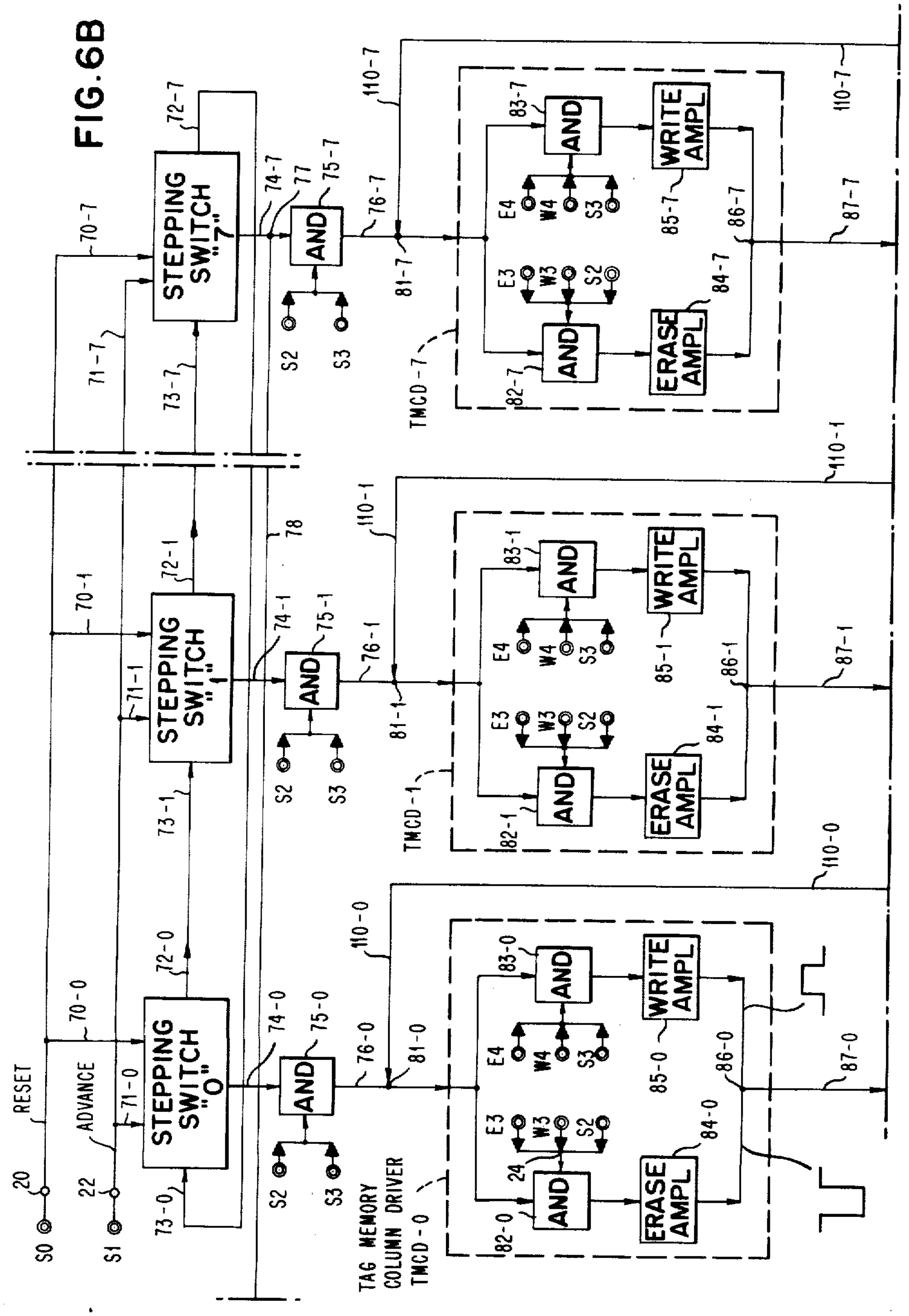

*Pulse generators.*—The pulse generators for producing the pulses which control the system to perform the four basic operations are shown in FIG. 6A. These pulse generators are the set up pulse generator 10, the read pulse generator 12, the erase pulse generator 14 and the write pulse generator 16. Each of these generators is actuated during the appropriate functional operation to produce a series of timed pulses at the terminals shown associated with the generator. Since the actual structure of the pulse generators, themselves, is not a part of the subject invention, and since they may be fabricated using any one of a large number of different components known in the art, each of the pulse generators is shown in block form. Each generator has associated with it an input terminal to which a pulse is applied to trigger the generator. For example, in FIG. 6A, the input terminal for the set up pulse generator is designated 101. Each generator is provided with a number of output terminals at which output pulses are produced for controlling the system when the generator is actuated. For example, set up pulse generator 10 is provided with four output terminals S0, S1, S2, and S3 and the pulses produced at these output terminals when the generator is actuated are shown in the pulse diagram immediately adjacent these terminals. When the set up pulse generator 10 is triggered, the first pulse produced is a pulse at the S0 terminal. This pulse resets counter C and stepping switch SS as described above (FIG 2B). This pulse also resets to zero eight flip flops 107–0 through 107–7 (FIG. 6F). Each of these flip flops forms part of the circuitry for indicating the results of comparisons performed on a corresponding one of the columns of the tag memory. Thereafter, pulses are successively produced at the S1, S2, and S3 terminals. This first group of three successive pulses produced at the S1, S2, and S3 terminals is employed to assign the first vacancy tag to the 0 column of the tag memory in the manner described above (FIGS. 2C–2E). Seven more successive groups of these pulses are provided to assign vacancy tags to the other seven columns of the tag memory.

The pulses developed at the S0, S1, S2, and S3 terminals are coupled to various control circuits in the system. However, in order to avoid over-complicating the drawings with the showing of these wiring connections, the various terminals in the circuit, to which the pulses developed at the S0, S1, S2, and S3 terminals are applied, are shown in the drawings with corresponding labels designating pulses which are there applied. For example, referring to FIG. 6B, the terminal 20 shown in that figure is coupled to the S0 terminal and has applied to it the pulses developed at the S0 terminal. In a similar manner the terminal immediately below, labeled 22, is coupled to the S1 output terminal of set up pulse generator 10 and receives each of the pulses developed at that output terminal when this pulse generator is triggered. A similar representation is used for the read, write and erase pulse generators and the input and output terminals for these generators. For example, referring to FIG. 6B, and the tag memory column drivers TMCD–0, there shown, it can be seen that the terminal 24 is connected to and receives pulses developed at the output terminal E3 of the erase pulse generator, the output terminal W3 of the write pulse generator, and the output terminal S2 of the set up pulse generator. The arrows on the lines connecting terminal 24 to the three terminals connected to the E3, W3, and S2 pulse generator output terminals are shown to indicate that pulses may be transmitted only from the output terminals to terminal 24 and not between the terminals themselves. Thus, the terminal 24 is actually the output of an OR circuit which receives inputs developed at the E3, W3, and S2 pulse generator terminals. Similar representations are employed at other terminals in the circuit which receive pulses from more than one pulse generator output terminal.

Figure 6C:
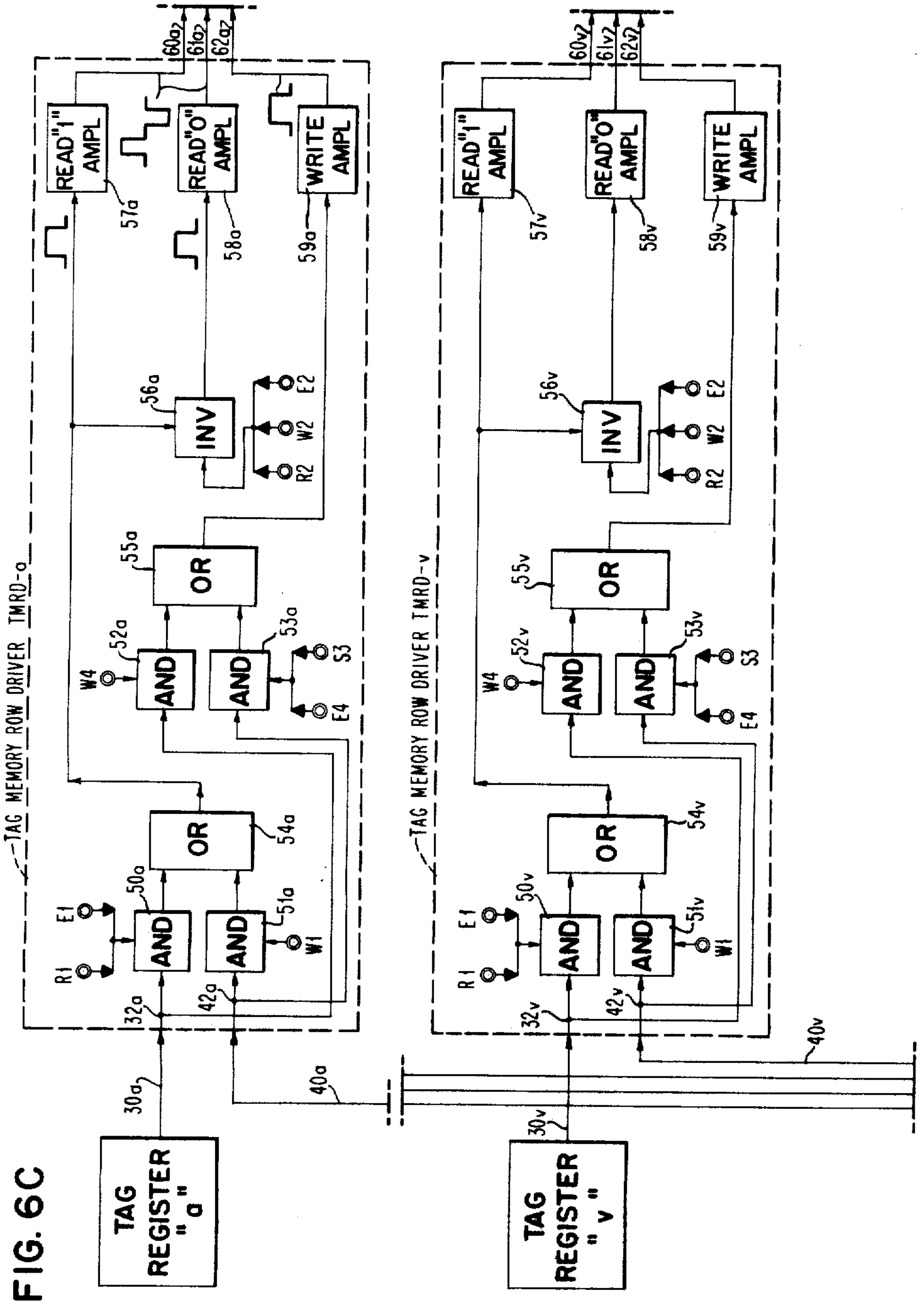
Figure 6D:
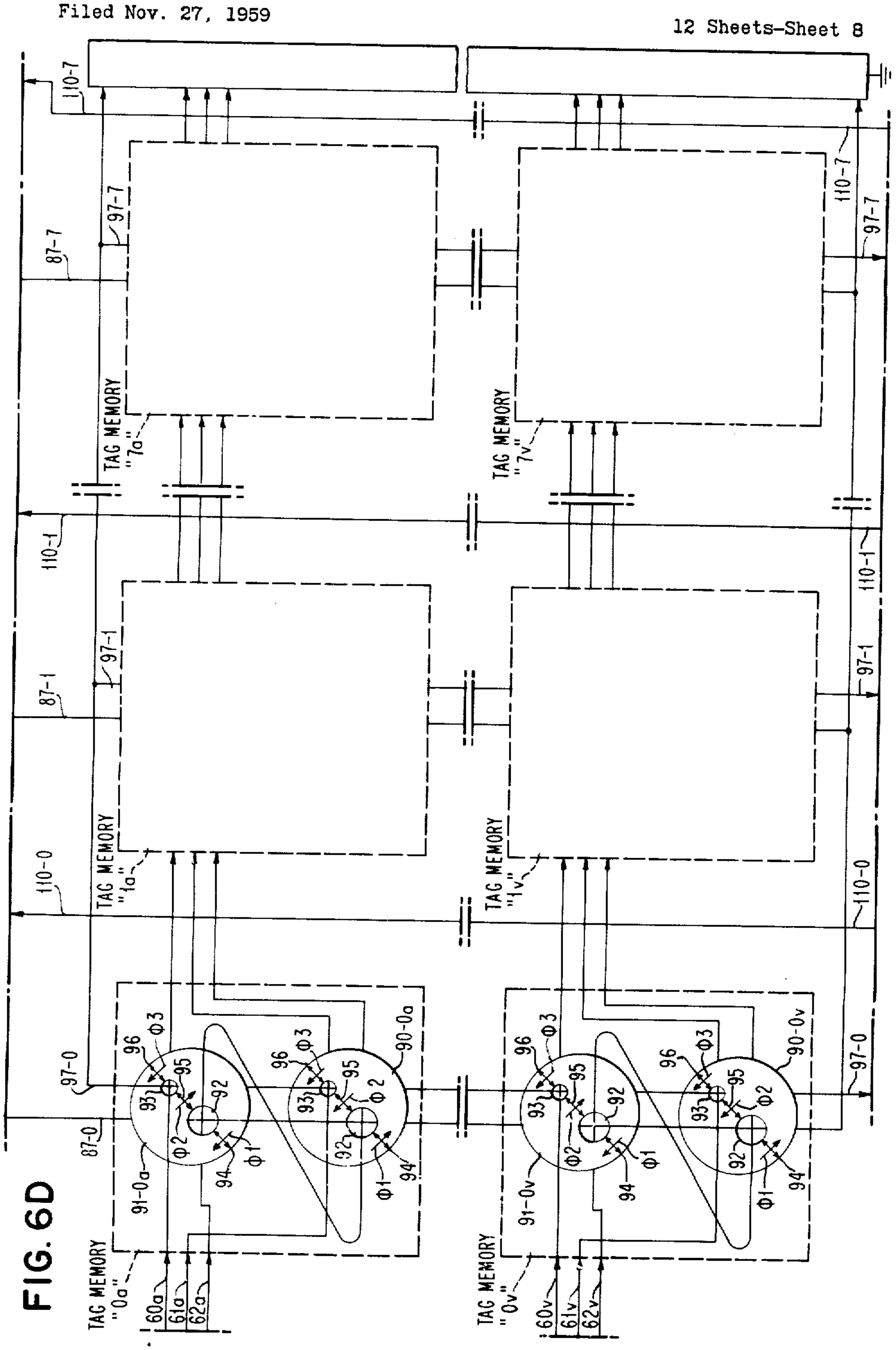

*Tag register.*—The tag register TR of applicant's system is shown in FIG. 6C. Only the "*a*" and "*v*" positions of the tag register are there shown since the system diagram of FIGS. 6A–6H shows the details of only the upper and lower rows and the 0, 1, and 7 columns of applicant's memory. Each of the tag register positions shown in FIG. 6C is of conventional design, and is in the form of a flip flop which is caused to assume binary one or binary zero representing conditions in response to information pulses applied thereto. The output lines for the two positions of the tag register shown are designated 30*a* and 30*v* and the operation is such that the output line for each tag register position is up, that is, it is at what is termed here a positive potential, when that position of the tag register is storing a binary one, and the output line is at zero potential when the flip flop is storing a binary zero. In accordance with the well established convention, the plus and zero potentials are merely used as terms of reference to indicate the difference in the potentials on the output lines 30*a* and 30*v* in accordance with the storage states of the "*a*" and "*v*" positions of the tag register.

*Tag memory row drivers.*—As was pointed out in the general description given above, an identifying tag stored in the tag register TR is compared with the tags stored in the tag memory during read and erase operations, and is actually transferred from the tag register into a selected column of the tag memory during the write operation. Similarly, the vacancy tag stored in the counter C is either compared with the tags in the tag memory or written in a selected column in the memory. The circuits which function to control these writing and comparing operations, based upon either a vacancy tag stored in the counter C or an identifying tag stored in the tag register TR, are shown in FIG. 6C. There is one such circuit for each row of the tag memory and each such circuit is termed a tag memory row driver. The two tag memory drivers shown in FIG. 6B are the ones for the "*a*" and "*v*"rows of the memory and are designated TMRD–*a* and TMRD–*v*, respectively. Since each of these row drivers operates in the same way, a description of the driver for the "*a*" row of the memory suffices to teach the operation of this portion of applicant's system.

Figure 6E:
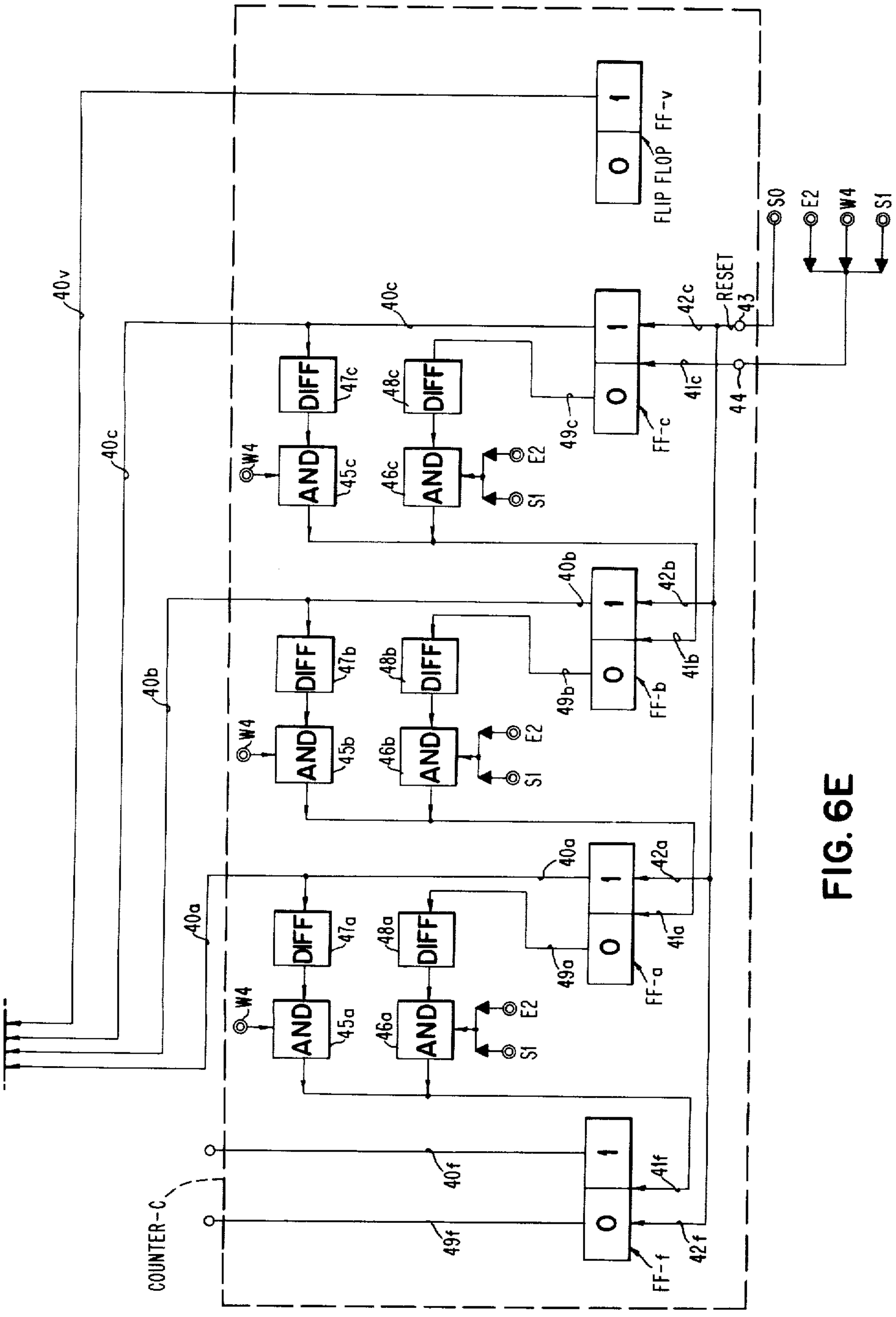
Figure 6F:
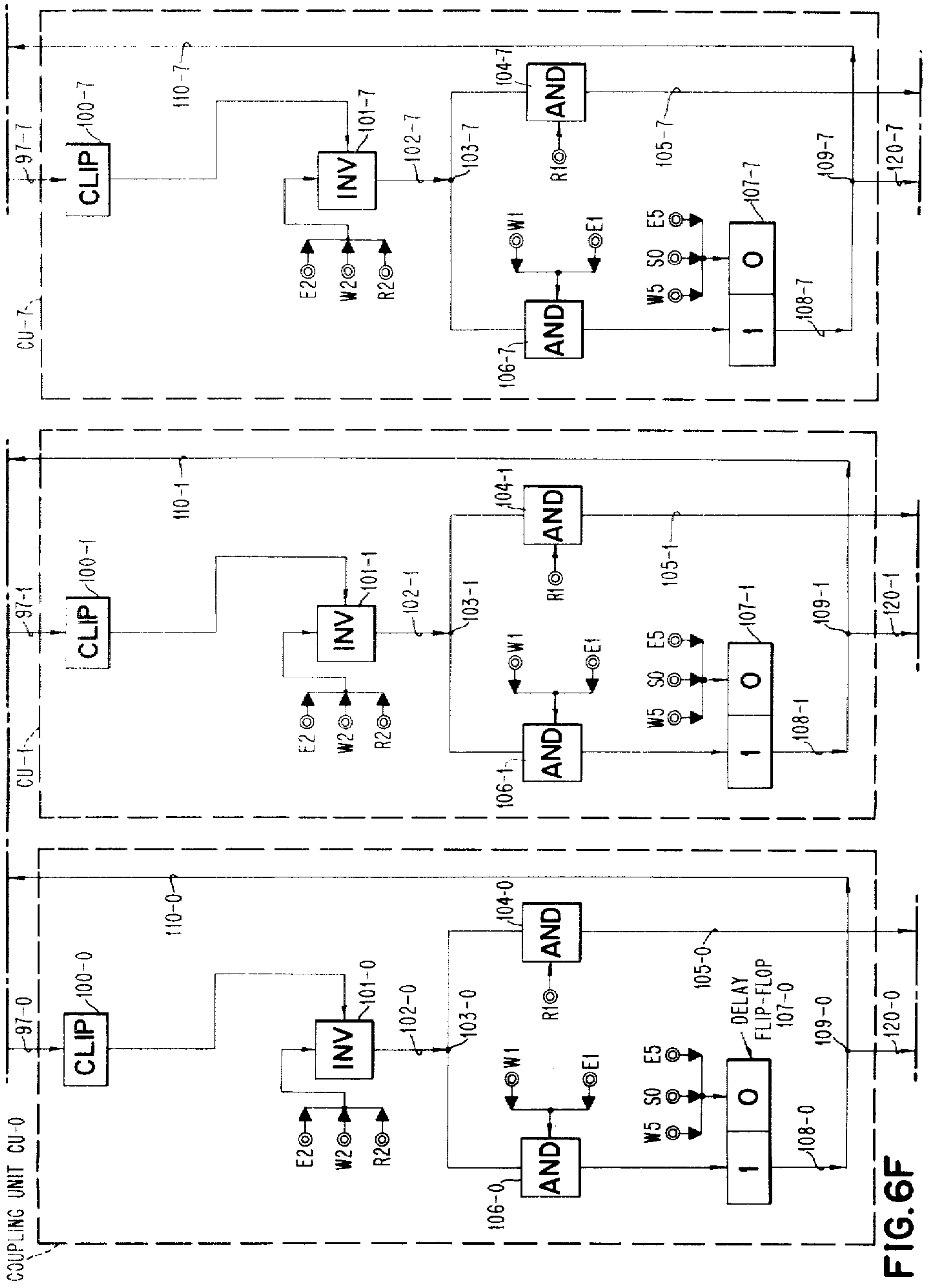

There are two inputs to the tag memory row driver TMRD–*a*, one of which is the output line 30*a* for the "*a*" position of the tag register TR and the other of which is the output line 40*a* for the bistable "*a*" position of the counter C, which is shown in FIG. 6E and which is described in detail below. For the present, it is sufficient to state that when the "*a*" position of the counter C is storing a binary one, there is positive potential present on the line 40*a* and, when this position of the counter is storing a binary zone, line 40*a* is at zero potential. The driver is provided with four AND circuits, 50*a*, 51*a*, 52*a*, and 53*a*, two OR circuits, 54*a* and 55*a*, an inverter circuit 56*a*, and three output amplifiers 57*a*, 58*a*, and 59*a*. The function of this driver is to control the production of output signals on three output lines 60*a*, 61*a*, and 62*a*, which are coupled to amplifiers 57*a*, 58*a*, and 59*a*, respectively. The output lines 60*a* and 61*a* are employed during the comparison operation, that is, when a tag in the "*a*" position of the tag register TR or the counter C, as the case may be, is to be compared with the tags stored in the corresponding row of the tag memory. The output line 62*a* is employed during an operation in which an identifying tag stored in the tag register or a vacancy tag stored in the counter C is to be written in a selected column of the tag memory. During the latter type operation, that is, when either an identifying or vacancy tag is being written in the tag memory, the tag memory row driver, in response to the tag register or counter, as the case may be, causes a pulse to be produced on output line 62*a* when a binary one is to be written and no pulses to be produced on this output line when a binary zero is to be written. During the comparison operation, an output signal in the form of successive plus and minus pulses is produced on the output line 60*a* when the "*a*" position of the tag register or counter, as the case may be, is storing a binary one, and a similar output signal is developed on the output line 61*a* when the appropriate position in the tag register or counter is storing a binary zero.

The production of the pulses on the output lines 60*a*, 61*a*, and 62*a* is controlled by AND, OR, and INVERTER circuits which form the driver and which are, in turn, controlled during the various operations by the pulse generators shown in FIG. 6A. For example, the output line 30*a* in the "*a*" position of the tag register TR is connected to a junction 32*a*, from which there extend in parallel, two lines, one of which is connected to an input for the AND circuit 50*a* and the other of which is connected to an input for the AND circuits 52*a*. The control input of AND circuit 50*a* is coupled both to the R1 output terminal of read pulse generator 12 and to the E1 output terminal of erase pulse generator 14. Therefore, when a pulse is developed at either the R1 or E1 output terminals, an input pulse is applied to AND circuit 50*a*. If the "*a*" position of the tag register TR is then storing one and its output line 30*a* is positive, a pulse is transmitted through the AND circuit 50*a* to and through OR circuit 54*a* to the input of read "1" amplifier 57*a*. The form of this pulse entering this amplifier is shown immediately adjacent the amplifier, and the shape of the output pulse produced is shown adjacent the output line for the amplifier, demonstrating that the amplifier 57*a*, in response to a single pulse, produces successive plus and minus pulses on output line 60*a*. When, during a read or erase operation, the output pulse developed on either output terminal R1 or output terminal E1 of the appropriate pulse generator is applied to AND circuit 50*a* at a time when the "*a*" position of the tag register is storing a binary zero, no output is produced by the AND circuit. Therefore, no input is applied to amplifier 57*a* and no output signal is produced on output line 60*a*. However, during read and erase operations, pulses are produced at the read output terminal R2 and the erase output terminal E2 and these pulses respectively overlap in time the pulses produced by R1 and E1 terminals for these pulse generators. These pulses are applied as inputs to the INVERTER circuit 56*a*. The OR circuit 54*a* is coupled as a control input to this INVERTER circuit so that, when there is no output produced by OR circuit 54*a*, the R2 or E2 pulse, as the case may be, is passed through the INVERTER circuit 56*a*, as an input to the read "0" amplifier 58*a*. This amplifier then produces an output signal in the form of successive plus and minus signals on output line 61*a*, indicating the presence of a binary zero in the "*a*" position of the tag register. When there is a binary one stored in the "*a*" position, an output is produced by the OR circuit 54*a*, as described above, which in effect, prevents the transmission of signals through the INVERTER circuit in response to the R2 and E2 pulses, so that no output is produced on output line 61*a*.

Thus, it can be seen that during read or erase operations, when a value stored in the "*a*" position of the tag register is to be compared with the value stored in the "*a*" position of each of the columns of the tag memory, an output signal is produced on the output line 60*a* when the "*a*" position of the tag register is storing a binary one and an output signal is produced on the output line 61*a* when the "*a*" position of the tag register is storing a binary zero.

A comparison operation is also carried out as part of a write operation when the vacancy tag then present in the counter C is compared with the vacancy tag in the tag memory, in order to determine the column in which the writing should be performed. The input from the "*a*" position of the counter is applied via line 40*a* to AND circuit 51*a* which also receives a pulse from the output terminal W1 on write pulse generator 16. When the "*a*" position of the counter is storing a binary one, the W1 pulse applied to AND circuit 51*a* causes a pulse to be transmitted to and through OR circuit 54*a* and thence to amplifier 57*a*, causing an output signal to be produced on output line 61*a*. When the "*a*" position of the counter is storing a binary zero, the operation is similar to that described above, and the W2 pulse applied to the INVERTER 56*a*, in the absence of an output signal from OR circuit 54*a*, causes an input pulse to be applied to amplifier 58*a* which, in turn, causes an output signal to be generated on output line 61*a*.

When the value written in the "*a*" position of the tag register is to be writen in the tag memory, the operation is as follows. Terminal 32*a* through which the output line for this position of the tag register is coupled is connected to input line for AND circuit 52*a*. This AND circuit receives a pulse from the write output terminal W4 of write pulse generator 16, so that, when the "*a*" position of the tag register is storing a binary one, the application of the W4 pulse to AND circuit 52*a* causes a pulse to be transmitted through OR circuit 55*a* to amplifier 59*a*. An output of proper polarity and magnitude is applied by this amplifier to output line 62*a*. When the "*a*" position of the tag register is storing a binary zero, no pulse is transmitted through the AND circuit 52*a* to OR circuit 55*a* and thus, no input is applied to amplifier 59*a* and no output is developed on output line 62*a*.

As explained above during the general description of applicant's system, values present in the register of counter C are written in the tag memory both during set up and erase operations. The manner in which the tag memory row drivers control this is as follows. The output line 40*a* for the "*a*" position of counter C is coupled to terminal 42*a* which is connected to one input of AND circuit 51*a* which, as described above, is employed during the comparison step or a write operation. Terminal 42*a* is also connected to one input line for AND circuit 53*a*. This AND circuit receives at its other input control pulses from the E4 output terminal and the S3 set up output terminal. When, during a set up or erase operation an E3 or S3 pulse is applied to AND circuit 53*a* with the "*a*" position of counter C storing a binary one, a pulse is produced at the output of this AND circuit. This pulse passes through OR circuit 55*a*, to the write amplifier 59*a* and an output of proper polarity and magnitude is produced on output line 62*a*. When, during an erase or set up operation the "*a*" position of the counter C is in its binary zero condition at the time the E4 or S3 pulse is applied, no pulse is transmitted through AND circuit 53*a* and, thus, no pulse is developed on output line 62*a*.

*Counter C*.—The counter C is shown in FIG. 6E. As was explained during the general description given above, this counter is capable of being stepped up or stepped down, according to the operation being performed. As further explained, the "*v*" position of the counter is not an operating part of the counter but always remains in its binary one state and the actual low order position of the counter is the "*c*" position. The counter includes five bistable storage devices in the form of conventional flip flops FF–*v*, FF–*c*, FF–*b*, FF–*a*, FF–*f*. Each of these flip flops with the exception of the flip flop FF–*v*, which is never changed in state, is provided with two inputs, the first of which is what is generally called a complement input. These inputs, for the respective flip flops, are designated 41*c*, 41*b*, 41*a*, and 41*f*. A pulse applied to the complement input of any one of these flip flops is capable of changing the state of the flip flop, that is, when the flip flop is in a binary one state, the pulse applied to the complement input switches the flip flop to its binary zero state. Conversely, when a complement input is applied to a flip flop in its binary zero state, it is switched to its binary one state.

Flip flops 41*a*, 41*b* and 41*c* are also provided with binary one inputs which are labeled 42*a*, 42*b* and 42*c*, respectively. A pulse applied to any one of these binary one inputs causes the flip flop to which it is applied to be switched to its binary one state regardless of the state it is in when the pulse is applied. The high order flip flop FF–*f* is provided with a binary zero input labeled 42*f*, which is effective when a pulse is applied, to switch this flip flop to its binary zero state regardless of the state it is in when the pulse is applied. The binary one inputs 42*a*, 42*b*, and 42*c* for the flip flops of the "*a*," "*b*," and "*c*" positions of the counter C are each connected to a terminal 43 which, as is indicated by the legend adjacent thereto, is coupled to the S0 output terminal for the set up pulse generator 10. The binary zero input 42*f* for the high order flip flop of counter C is also coupled to terminal 43 so that, when during the set up operation a pulse is produced at output terminal S0 of set up pulse generator 10, the "*a*," "*b*," and "*c*" positions of counter C are set to their binary one state and the "*f*" position of this counter is set to its binary zero state (FIG. 2B).

The complement input for the low order position of the counter C is coupled to a terminal 44, which, as is indicated, is connected to the output terminal E1 of erase pulse generator 14, the output terminal W4 of the write pulse generator 16, and the output terminal S1 of the set up pulse generator 10. It is the outputs developed at these output terminals during erase, write and set up operations, which are applied to terminal 44 of counter C to cause the counter to be stepped up or down by one according to the operation being performed. The counter is controlled to be either stepped up or down by one (in response to pulses applied at terminal 44) by six AND circuits designated 45*a*, 45*b*, 45*c*, 46*a*, 46*b*, and 46*c*, which are connected in the circuitry coupling the stages of the counter one from the other. Each of the flip flops forming the stages of the counter C is provided with a binary one output line and a binary zero output line. The binary one output lines are labeled 40*a*. 40*b*, 40*c*, and 40*d*, and the binary zero output lines are labeled 49*c*, 49*b*, 49*a*, and 49*f*. The binary one output lines, as described above, apply inputs to appropriate ones of the tag memory row drivers shown in FIG. 6C. A connection is also provided from each of the binary one output lines, with the exception of output line 40*f* for the high order position, to the complement input for the next higher order position of counter C. Similarly, a connection is provided from each binary zero output line to the complement input of the next higher order position of the counter. For example, consider the connection between flip flops FF–*c* and FF–*b*. A circuit is available from the binary one output line 48*c* through a differentiating circuit 47*c* and AND circuit 45*c* to the complement input 41*b* of flip flop FF–*b*. The binary zero output circuit extends from output line 49*c* through differentiating circuit 48*c* and AND circuit 46*c* to the complement input 41*b* of flip flop FF–*b*. Similar circuits are provided between the "*b*" and "*a*" stages of the counter and between the "*a*" and "*f*" stages. The circuits coupling the binary one outputs for each stage to the complement input of the next stage are activated when the counter is to be stepped down by subtracting a one from the value in the counter in response to a pulse applied at terminal 44 and are termed borrow circuits. The circuits coupling the binary zero outputs for each stage to the complement input for the next stage are activated when the counter is to be stepped up by adding a one to the value in the counter in response to a pulse applied at terminal 44. These circuits are termed carry circuits.

The activation of these circuits coupling the counter positions is under control of pulses applied by the pulse generators of FIG. 6A to the AND circuits 45*a*, 45*b*, 45*c*, 46*a*, 46*b*, and 46*c*. The function of the differentiating circuits 47*a*, 47*b*, 47*c*, 48*a*, 48*b*, and 48*c* is two-fold. First, these circuits prevent the transmission of D.C.

signals between stages and, secondly, they serve as rectifiers in that they allow only pulses of one polarity to be transmitted from stage to stage. Thus, the operation of the differentiating circuits 47*a*, 47*b*, and 47*c* may be understood by a consideration of the latter circuit at a time when a pulse developed on W4 output terminal of write pulse generator 16 is applied to the control input of AND circuit 45*c* and the counter input at terminal 44. If the flip flop FF–*c* is in the binary one condition, the pulse applied at terminal 44 switches it to its binary zero state. As a result, the potential on output line 40*c* is reduced from the positive value representative of a binary one to zero potential. This voltage excursion is prevented from reaching AND circuit 45*c* by the rectifying action of differentiating circuit 47*c*. However, during a write operation with AND gates 45*a*, 45*b*, and 45*c* open due to the presence of the W4 pulse, a signal is transmitted from each low order position to the complement input of the next higher order position whenever the state of the lower order position is changed from zero to one causing the potential on the binary one output line to go from zero to a positive potential. Thus, if the flip flop FF–*c* is in its binary zero state when W4 pulses are applied to terminal 44 and AND circuit 45*c*, this flip flop is switched to its binary one state causing a positive pulse to be developed on line 48*c*. This pulse is transmitted through differentiating circuit 47*c* and AND circuit 45*c* to the complement input 42*b* of flip flop FF–*b*.

The operation to transmit pulses between the successive stages during a set up (add) operation is similar. The differentiating circuits 48*a*, 48*b*, and 48*c* transmit pulses only in response to changes in potential levels in a positive direction. Thus, for example, considering flip flop FF–*c* and its binary zero output line 49*c*, which is connected to differentiating circuit 48*c*, no pulse is transmitted through the differentiating circuit as long as the flip flop FF–*c* remains either in the binary zero or binary one state or when it is switched from its zero to its one state. However, when the flip flop is changed from its binary one to its binary zero state, causing the voltage on line 49*c* to go from zero to positive, a signal is transmitted through differentiating circuit 48*c*. Each of the AND circuits 46*a*, 46*b*, and 46*c* which couple the binary zero outputs of one stage to the complement input of the next stage, receives control inputs developed in the S1 and E2 output terminals. Considering stage FF–*c* as being exemplary, if this stage of the counter is changed from its binary one to its binary zero state during a set up or erase operation when a pulse is applied at terminal 44, a pulse is transmitted to the complement input 41*b* at flip flop FF–*b* to thereby change the state of this flip flop.

The output lines 40*f* and 49*f* for the "*f*" or high order position of the counter are provided in order that they might be a continuous output indication as to whether there are any empty positions left in the memory. As was explained during the general description above, the "*f*" position of the counter is in its binary zero state only when the memory is full. Whenever there is one or more empty positions in the memory, the "*f*" position of the counter is in its binary one state. Thus, when the memory is full, output line 48*f* is positive and output line 49*f* is at zero potential. When there are one or more empty positions in the memory, output line 49*f* is at zero potential and output line 49*f* is at a positive potential, it being noted the terms zero potential and positive potential are relative.

It should be further noted that, at any time, the actual value stored in the flip flops which form the counter register may be obtained by observing the voltages on the binary one and binary zero outputs for each position of the counter. As was mentioned in the general description given above, the actual value stored in the counter indicates the number of empty columns then left in the memory.

Figure 6G:
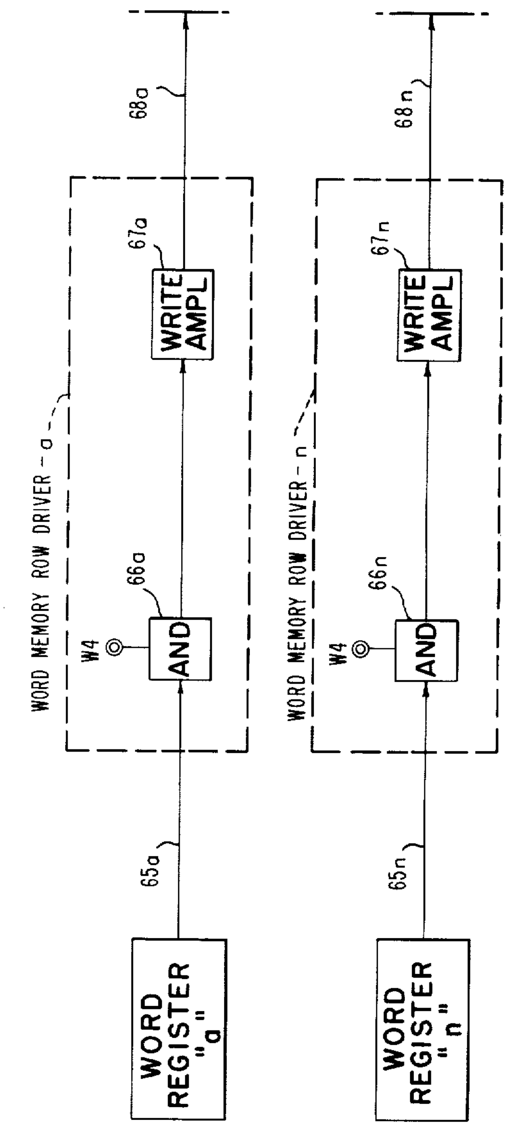

*Word register and word memory row drivers.*—Two positions, the "*a*" and "*n*" positions of the word register, as well as the driver circuits for transferring information from these positions of the register to the word memory are shown in FIG. 6G. The word register comprises a plurality of conventional bistable storage devices such as the two indicated by the block diagrams of FIG. 6G. Each is provided with an output line, as is indicated at 65*a* and 65*n*, which is positive if the associated position of the register is storing a binary one and is at zero potential when storing a binary zero. Considering the circuitry for row "*a*" of the word memory, the output line 65*a* for the "*a*" position of the word register is connected as an input to AND circuit 66*a* which, together with a write amplifier 67*a*, forms the word memory row drivers for the "*a*" position of the word memory. AND gate 66*a* receives a control input whenever a pulse is developed at the W4 output terminal of write pulse generator 16. When, with the line 65*a* positive, indicating the storage of a binary one, a pulse is developed at this output terminal, a signal is transmitted through the AND circuit 66*a* to the write amplifier 67*a* and thence to a line 68*a* which applies inputs to this row of the word memory. This output pulse on line 68*a* is what is termed a half select pulse, being of itself of insufficient magnitude to produce a change in state in any of the storage devices of the word memory to which it is applied, but being effective, when applied at the same time a similar pulse is applied to a column drive line for the word memory, to produce a change from the zero to the one state in the storage device to which both pulses are applied. When the "*a*" position of the word register is storing a binary zero, the potential of output line 65*a* is zero and, therefore, no pulse is transmitted through AND circuit 66*a* to write amplifier 67*a* and no output is produced on the line 68*a*.

*Stepping switch SS.*—The stepping switch SS, which controls the assignment of vacancy tags to the various columns of the memory during the set up operation, is shown in FIG. 6B. The stepping switch includes eight bistable devices, one for each of the columns in the memory. Each position of the stepping switch is provided with a reset input 70–0 through 70–7 and an advance input 71–0 through 71–7. The reset input for the various positions of the stepping switch are coupled to a terminal 20 which, as indicated, receives a pulse from the S0 output terminal of set up pulse generator 10. The functional operation achieved by the application of pulses at terminal 20 is illustrated in FIGS. 2A and 2B, which show that the reset pulses applied to the reset inputs 71–0 through 71–6 set the corresponding seven positions of the stepping switch in a binary zero state and the reset pulse applied to reset input 70–7 sets the bistable device for the column 7 to its binary one state. The advance inputs 71–0 through 71–7 for the eight positions of the stepping switch are coupled to terminal 22 which, as indicated, receives a pulse developed at output terminal S1 of the set up pulse generator 10. Each position of the stepping switch is also provided with an output line 72–0 through 72–7 and an input line 73–0 through 73–7, with the output lines for each position of the stepping switch coupled to the input line for the next position of the switch. The output line 72–7 for the colum 7 position of the switch is coupled to the input line 73–0 for the column 0 position of the stepping switch. The operation of the stepping switch is the same as that of conventional ring circuits in that each time a pulse is applied to terminal 22 and, therefore, to the advance inputs 71–0 through 71–7 for the eight positions of the stepping switch, an output pulse is produced only on the output line for the particular one of the stepping switch positions which is storing a binary one at the time the advance pulse is applied. This pulse is transmitted to the input of the next position of the stepping switch to change the state of that position from its binary zero state to its binary one state. The application of the stepping pulse to the particular position storing a binary one causes the state of this position to be changed from binary one to binary zero. Each position of the stepping switch is also provided with an output 74–0 through 74–7 which is at zero potential when the corresponding position of the stepping switch is storing a binary zero and is at a positive potential when the corresponding position of the stepping switch is storing a binary one. These outputs at 74–0 through 74–7 are applied as inputs to corresponding AND gates designated 75–0 through 75–7. Each of these AND gates receives control signals both from the S2 and S3 output terminals of the set up pulse generator so that whenever an output pulse is developed on either the S2 or S3 output terminal of the set up pulse generator, a pulse is transmitted through the one of the AND circuits 75–0 through 75–7 which is associated with the position of the stepping switch which is then in its binary one state. The output lines for these AND circuits are designated 76–0 through 76–7 and pulses developed on these output lines are applied to the input terminals for the corresponding tag memory column drivers. Thus, the output line 76–0 of AND circuit 75–0 is coupled to a terminal 81–0, which serves as the input terminal for the tag memory column driver TMCD–0 for the 0 column of the tag memory.

The output line 74–7 for the bistable devices which forms position 7 of stepping switch SS is provided with a terminal 77 which is coupled by a line 78 to an AND circuit 79 (FIG. 6A). The output line 74–7 is positive only when the position 7 of the stepping switch is storing a binary one and it is only at this time that line 78 applies a positive potential to AND circuit 79. This AND circuit also receives a control input from the S3 output terminal for the set up pulse generator 10. When a pulse is developed at this output terminal at a time when line 78 is positive due to the fact that the position 7 of the stepping switch is in a binary one state, the pulse is transmitted through the AND circuit via a line 80 back to the set up pulse generator 10 to shut off this generator so that no more pulses are produced on the S1, S2, and S3 output terminals thereof. From the diagrams of FIGS. 2A through 2K, which illustrate the set up operation, it can be seen that these conditions are met, that is, a binary one stored in position 7 of the stepping switch at a time when an output pulse is developed on the S3 output terminal, only during the final step of the set up operation shown in FIG. 2K.

*Tag memory column drivers.* — There are eight tag memory column drivers in applicant's disclosed system, only three of which, those for columns 0, 3, and 7 are shown in FIG. 6B. The operation of each of these drivers is similar and, therefore, a detailed description of that for column 0, which is designated TMCD–0, suffices to explain the operation of all of the drivers. The driver TMCD–0 includes two AND circuits, designated 82–0 and 83–0, an erase amplifier designated 84–0, and a write amplifier designated 85–0. These components form two parallel paths between the input terminal 81–0 for the column driver and an output terminal 86–0 for the driver. Pulses are applied to the input terminal 81–0, as described above, when during the set up operation, the bistable devices for the column 0 position of the stepping switch is in a binary one condition and a pulse is developed either on the S2 or S3 output terminal for the set up pulse generator 10. Pulses are also applied to input terminal 81–0 via a line 110–0 during erase and write operations in a manner later to be described in detail. It suffices for the present to state that a positive potential is applied to terminal 81–0 via line 110–0 when, during the comparison step of either an erase or write operation, a comparison is achieved on column 0 of the tag memory.

The transmission of the signals applied at input terminal 81–0 to the output terminal 86–0 is controlled by pulses applied to AND circuits 82–0 and 83–0. AND circuit 82–0 receives control inputs from the E3 output terminal of the erase pulse generator 14, the W3 output terminal of the write pulse generator 16 and the S2 output terminal of the set up pulse generator 10. Whenever a pulse is developed at one of these output terminals at a time when an input pulse is being applied to input terminal 81–0, a pulse is transmitted from the AND circuit 82–0 to erase amplifier 84–0. Erase amplifier 84–0 produces a full select erase pulse which is transmitted to output terminal 86–0 for the driver. This full select erase pulse is effective, in a manner later to be described in detail, to reset each of the storage devices in column 0 of the tag memory to its binary zero condition. This step of resetting each of the cores in a given column to zero is performed during erase operations, write operations, and set up operations, as explained in the general description given above, and as indicated by the fact that control inputs are applied to the AND circuit 82–0 from output terminals of the erase pulse generator, the write pulse generator and the set up pulse generator. AND circuit 83–0 also receives control pulses from the erase, write and set up pulse generators, but receives these pulses from the E4, W4, and S3 output terminals of these generators. As shown in FIG. 6A, these pulses are developed at these output terminals immediately after the pulses which are applied to the AND circuit 82–0. Whenever a pulse is developed at one of these output terminals (E4, W4, or S3) at a time when a signal is present at terminal 81–0, a pulse is transmitted through AND circuit 83–0 to write amplifier 85–0. This amplifier, in response to this input pulse, produces at terminal 86–0 a half select pulse of proper polarity to write a binary one in each of the cores in column 0 of the tag memory. The pulse developed by write amplifier 85–0 is of opposite polarity to and of lesser magnitude than the pulse developed by erase amplifier 84–0. The half select output pulses developed at terminal 86–0 by write amplifier 85–0 are applied simultaneously with the half select pulses applied to the tag memory row drive lines 62*a*–62*v* under control of the row drivers (FIG. 6C) for the tag memory. The details of the operation of these half select pulses in writing information in the storage device of the tag memory are described in detail below.

*Tag memory.*—FIG. 6D shows six of the bistable storage devices of the tag memory TM. The storage devices are shown within blocks identified by the designations 0*a*, 1*a*, 7*a*, 0*b*, etc., which are used in the block diagram of FIG. 1. The operation of each of the storage devices of the tag memory is the same. Therefore, a complete description is given only for the storage device of the tag memory position 0*a*.

The storage device for position 0*a* of the tag memory includes two cores designated 90–0*a* and 91–0*a*. The construction of each of these cores and the mode in which they are operated is described in detail in an article entitled the "Transfluxer" which appeared in the Proceedings of the IRE for March 1956, at pages 321–328. Further, a memory of the same general type and using similar storage devices is the subject of a copending application Serial No. 855,622, now Patent No. 3,104,380, filed in behalf of the inventor of this system on even date herewith. Each of the cores includes an input aperture 92 and an output aperture 93. These apertures divide the core into three legs, designated 94, 95, and 96. Legs 94 and 95 form a closed magnetic flux path around aperture 92. Leg 96 and a portion of leg 95 form a closed flux path around aperture 93. Each of these cores has two stable states, one of which is termed a blocked state and the other of which is termed an unblocked state. The core is said to be in a blocked state when the flux in leg 95 is oriented in the same direction as the flux in leg 96. Each core is in its unblocked state when the flux in these legs is oriented in opposite directions. The storage 0*a* is storing a binary one when core 91–0*a* is blocked and core 90–0*a* is unblocked and is storing a binary zero when the condition of both cores is switched, that is, when core 91–0*a* is unblocked and core 90–0*a* is blocked. The flux orientation for the legs 94, 95, and 96 of these cores when storing a binary zero is illustrated by the arrows $\phi 1$, $\phi 2$, and $\phi 3$. The flux in the legs 96 of cores 90–0*a* and 91–0*a* is normally oriented in a counterclockwise direction, with reference to aperture 93, as is indicated by arrows $\phi 3$. Therefore, with the cores storing a binary zero, core 91–0*a* is unblocked, as shown, with the flux in its leg 95 oriented in a counterclockwise direction with reference to aperture 93 and clockwise with reference to aperture 92. Core 90–0*a* has its flux around aperture 92 oriented in a counterclockwise condition and is unblocked. The cores are switched between the blocked and unblocked states under control of two windings threaded through apertures 92, one of which is connected to the column drive line 87–0 for the 0 column of the tag memory. This drive line is connected to the output terminal 86–0 for the tag memory column driver TMCD–0. The other drive line is designated 62*a* and is the row driver for the "*a*" column of the tag memory and is one of the three output lines for the tag memory row driver TMRD–*a* shown in FIG. 6C. Lines 67–0 and 62*a* link the apertures of cores 90–0*a* and 91–0*a* in opposite senses. The cores are reset to a binary zero state by a full select pulse applied to drive line 87–0. Each such pulse is effective to orient the flux around aperture 92 of core 91–0*a* clockwise and around aperture 92 of core 90–0*a* counterclockwise so that the former is unblocked and the latter is blocked. A binary one is written in the cores by coincidently applying half select signals of a polarity opposite to the reset signal to column drive line 87–0 and a row drive line 62*a*. The magnitude of these signals is such that each is insufficient of and by itself to reverse the flux around the apertures 92 but, when applied simultaneously, the signals cause the flux around these apertures to be reversed so that core 91–0*a* is blocked and core 90–0*a* is unblocked.

The states of the cores are sensed by applying input signals to the lines 60*a* and 61*a* which are threaded through the apertures 93 of cores 91–0*a* and 90–0*a*, respectively. These lines are the output lines for the row driver TMRD–*a* of FIG. 6B and, as there indicated, the signals applied to these lines are in the form of successive positive and negative pulses. When such a signal representing a binary one is applied to line 60*a* with the core 91–0*a* in an unblocked state (binary zero stored), the positive pulse produces a flux reversal around aperture 93, thereby producing an output signal on an output winding 97–0 which is threaded through this aperture to embrace leg 96. The following negative pulse on line 60*a* reverses the flux around aperture 93 to its initial condition and produces a second output signal on line 97–0. When the core 91–0*a* is in a blocked state (binary one stored), the plus and minus pulses, which form the signal applied to line 60*a*, are ineffective to produce a flux reversal around aperture 93 and, therefore, no output signal is generated on output line 97–0. As was explained above with reference to the tag memory row driver of FIG. 6B, line 60*a* receives a signal only during a comparison operation when the associated position of the tag register or counter being compared on is storing a binary one. Therefore, when a signal indicative of a binary one is applied to line 60*a*, an output pulse is generated on drive line 97–0 when the 0*a* storage position is storing a binary zero and core 91–0*a* is in an unblocked state. No output pulse is generated by core 91–0*a* when a binary one is stored and the core is in a blocked state.

Core 90–0*a* is sensed in the same manner by signals developed on line 61*a* of the tag memory row driver TMRD–*a*. This line receives a signal in the form of successive plus and minus pulses during a comparison step only when the associated position of the tag register or counter, as the case may be, is storing a binary zero. When the core 90–0*a* is in an unblocked state, that is, when a binary one is stored in this position of the tag memory, successive plus and minus outputs are produced on output line 97–0 which threads aperture 93 on core 90–0*a*. When a binary zero is stored in this position of the tag register and core 90–0*a* is therefore in a blocked condition, the signal applied to line 61*a* during the comparison step is ineffective to produce flux reversal around aperture 93 of this core and no output signal is produced by this core on output line 97–0.

Two such cores operated in the same manner are provided for each storage position in the tag memory. The operation may be summarized as follows, again, making specific reference to the tag memory position 0*a* which includes cores 91–0*a* and 90–0*a*. The cores are reset to represent a binary zero by applying full select signals to column drive line 87–0 to thereby set core 91–0*a* to its unblocked state and core 90–0*a* to its blocked state. A binary one is written in the storage position by coincidentally energizing the column drive line 87–0 and the row drive line 62*a* with positive half select pulses to thereby set core 91–0*a* to its blocked condition and core 90–0*a* to its unblocked condition. Comparison operations are achieved by applying a signal to either line 60*a* or 61*a*, a signal applied to the former line representing a binary one input and a signal applied to the latter line representing a binary zero input. Line 60*a* links only core 91–0*a* and, when a binary one representing signal is applied to this line, an output is produced on output line 97–0 only when a binary zero is stored in this position of the tag memory and core 91–0*a* is in an unblocked condition. If, when a binary one representing signal is applied to line 60*a*, core 91–0*a* is in a blocked condition, indicating the storage of a binary one in this memory position, no output signal is produced on line 97–0. The comparison of a binary zero with the value stored in this position of the tag memory is similiar. The binary zero representing signal is applied to line 61*a* which links core 90–0*a* and an output is produced on line 97–0 in response to such a signal only when a binary one is stored in this position of the tag memory.

Thus, during a comparison operation, when the value stored in any position in the "*a*" row of the tag memory does not compare with the value represented by the input signal (either on line 60*a* or 61*a*), an output is produced on output line 97–0. When the stored value is the same as the value represented by the signal applied to the appropriate one of the lines 60*a* or 61*a*, no output is produced on line 97–0, thereby indicating a comparison. During each comparison operation a binary one or a binary zero signal is applied to the appropriate one of each pair of row drive lines 60*a* and 61*a* through 60*v* and 61*v*, to thereby effect a simultaneous comparison of the tag stored in the tag register TR or counter C with all of the tags stored in the columns of the tag memory. Where the value of the tag in any column differs from the value of the tag being compared in one or more positions, an output signal is produced on the output line 97–0 through 97–7 for that column. No output signal is developed on the output line for the column storing the tag which compares with the tag on which the comparison is being made.

*Coupling units.*—FIG. 6F shows the coupling units for columns 0, 1, and 7 of the memory. The function of these units is to receive outputs from the tag memory TM during a comparison step and to direct these outputs selectively both back to the tag memory and also to the word memory to control subsequent erase and write operations therein. Each of the coupling units is of the same construction and, therefore, only a detailed description of the coupling unit CU–0 is given. This unit is provided with an input line which is the output line 97–0 for column 0 of the tag memory. As explained above, a signal, in the form of successive plus and minus pulses, is produced on this line during a comparison operation when the value stored in column 0 of the tag memory does not compare exactly with the value stored in the tag register TR or counter C on which the comparison is being made. The signal on line 97–0 is applied to a clipping circuit 100–0 which allows only the positive portion of the signal to pass. The output of the clipping circuit 100–0 is applied as a control input to an INVERTER circuit 101–0. As indicated by the terminals shown associated with INVERTER circuit 101–0, inputs are applied to this INVERTER circuit in response to output pulses developed on the E2 output terminal of erase generator 14, the W2 output terminal of write pulse generator 16 and the R2 output of read pulse generator 12. When during an erase, write or read operation a pulse is developed at one of these output terminals and applied as an input to INVERTER circuit 101–0, an output is produced by this INVERTER circuit only in the absence of a pulse applied by the control input to the INVERTER. This occurs when no signal is produced on line 97–0 and, therefore, no output is passed through the clipping circuit 100–0. No signal is present on line 97–0 during a comparison step when the value stored in column 0 of the tag memory compares exactly with the value on which the comparison is being made. Therefore, it is only when a succesful comparison is made that an output is produced on the output line 102–0 for this INVERTER in response to an E2, W2, or R2 pulse.

Line 102–0 is connected to terminal 103–0 from which extend two parallel paths. The first of these paths includes an AND circuit 104–0 which, as indicated, receives control inputs developed on output terminal R1 of read pulse generator 14. When at this time during a read operation, a comparison has been achieved on column 0, a pulse indication of the fact of the comparison is developed on terminal 103–0 and is applied as an input to AND circuit 104–0. This input to the AND circuit is gated by the R1 pulse and an output appears on line 105–0. This line is connected to the read control amplifier for column 0 of the word memory and, in a manner to be described in detail below, the presence of a pulse on line 105–0, which occurs only during a read operation when a comparison is achieved on column 0 of the tag memory, causes the associated column of the word memory to be read out. The other parallel path from terminal 103–0 extends through an AND circuit 106–0 to the binary one input of delay flip flop 107–0. As explained above, this flip flop, as well as flip flops 107–1 through 107–7 is reset to its binary zero state during a set up operation. And circuit 106–0 receives control inputs developed on the output terminal W1 of write pulse generator 16 and the output terminal E1 of erase pulse generator 14. Therefore, when during the comparison step of a write or erase operation, a pulse is applied to terminal 103–0 indicative of a comparison on column 0 of the tag memory, this pulse is applied as an input to AND circuit 106–0 and is gated through this AND circuit under the control of the W1 or E1 pulse, as the case may be, to the binary one input of delay flip flop 108–0. This delay flip flop is capable of assuming either a binary one or binary zero state and a pulse passed through the AND circuit 106–0 is effective to set this flip flop in its binary one state. With the delay flip flop 107–0 in its binary one state, the binary one output line 108–0 for this flip flop is maintained at a positive potential and, therefore, the terminal 109–0 is at a positive potential. This positive potential is transmitted from this terminal via a line 110–0 back up through FIGS. 6F and 6D to the input terminal 81–0 of the tag memory column driver TMCD–0 for column 0 of the tag memory. The presence of this positive potential at this input terminal for the column driver controls the performance of subsequent functional steps on column 0 of the tag memory.

The positive potential developed at terminal 109–0 (FIG. 6F) during write and erase operations is also transmitted via line 120–0 to the word memory column driver WMCD–0 (FIG. 6H), which controls erase and write operations on column 0 of the word memory, as described below in detail. Delay flip flop 107–0 remains in its binary one condition during write and erase operations until output pulses are developed on either the output terminal W5 of the write pulse generator or the output terminal E5 of the erase pulse generator, which pulses are applied to the zero input of this flip flop to reset it to its binary zero condition and cause the voltage level on output line 108–0 and, thereof, at terminal 109–0 to return to zero.

Figure 6H:
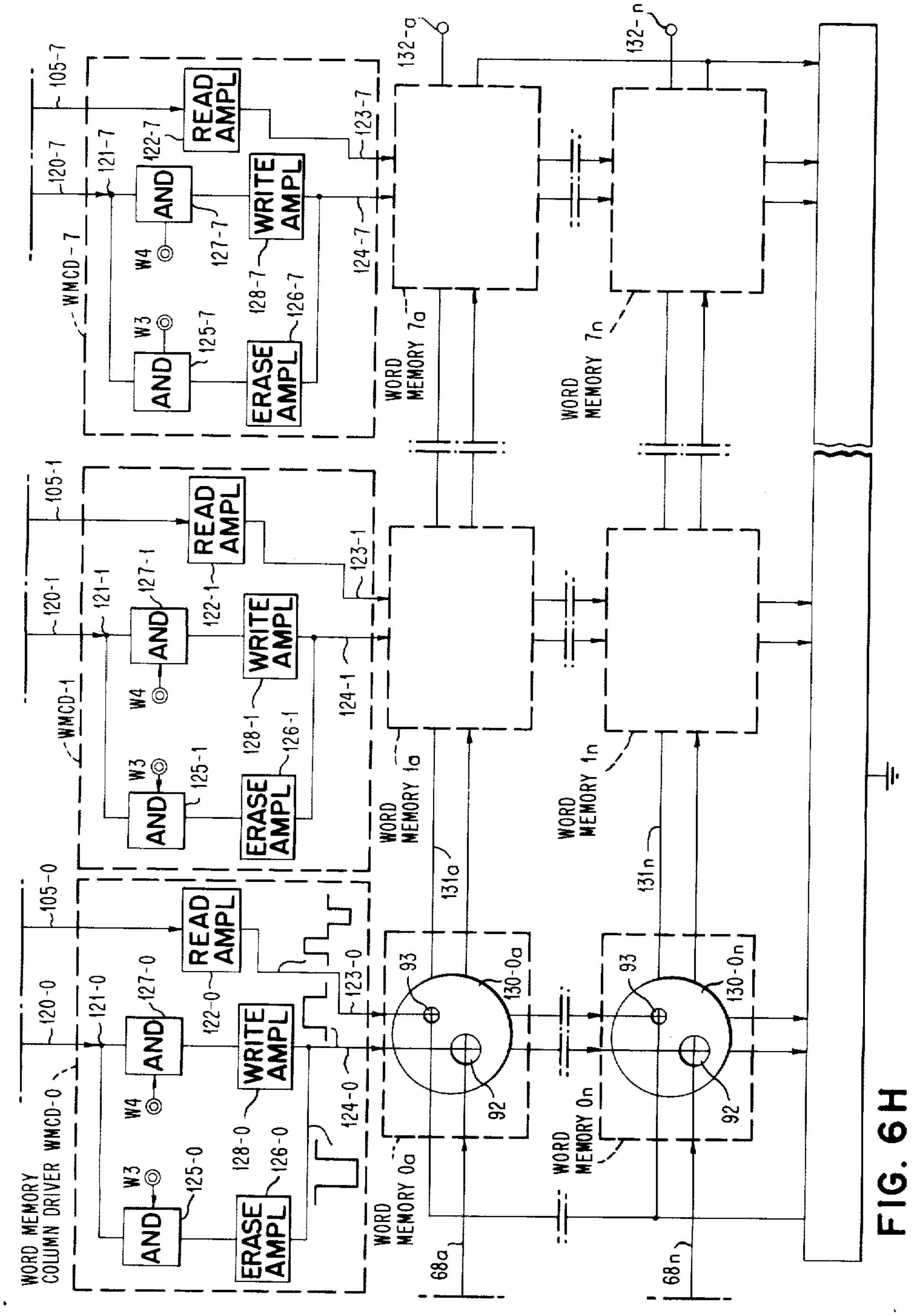

*Word memory column drivers.*—The word memory column drivers for columns 0, 1, and 7 of the memory are shown in FIG. 6H. Referring to the driver WMCD–0 for column 0 of the memory, it can be seen that there are two input lines to this driver, designated 120–0 and 105–0. Input pulses to the driver are developed on these lines, as explained above, as a result of the comparison steps performed during read, write, and erase operations. Thus, when during the comparison step of the read operation, the number being compared on is stored in the 0 column of the memory, a pulse is developed on line 105–0 which is applied as an input to a read amplifier 122–0. The read amplifier produces an output of proper magnitude and polarity to sense the state of the cores in column 0 of the word memory in a manner which will be described in detail below. It suffices to say for the present that when a pulse is developed on line 105–0, an output pulse is produced on the output line 123–0 for the column 0 word memory driver.

As explained above, pulses are developed on line 120–0 during the compare step of write and erase operations when the tag being compared on is stored in column 0 of the tag memory. These pulses are applied at terminal 121–0 of the word memory column driver from which terminal two parallel paths extend to the second output line 124–0 for the driver. One of these paths includes an AND circuit 125–0 and an erase amplifier 126–0. The other path includes an AND circuit 127–0 and a write amplifier 128–0. AND circuits 125–0 and 127–0 are controlled by pulses developed on the output terminals W3 and W4 of write pulse generator 16 so that pulses applied on line 120–0 are transmitted to the output line 124–0 of this driver only during write operations. As was described in the general description above, during each write operation, the column of the word memory on which the operation is being performed is completely reset. This is accomplished when, with a positive potential present at terminal 121–0, an output pulse is developed on output terminal W3 of the write pulse generator, thereby allowing a pulse to be transmitted through AND circuit 125–0 to erase amplifier 126–0. Erase amplifier 126–0, when it receives an input pulse, produces a negative full select output pulse as indicated in FIG. 6H. This pulse is transmitted to line 124–0 and resets all of the cores in column 0 of the word memory as described in detail below. During the write operation, after the storage devices in the column being operated on are reset to zero, a new word of information is written in the word memory. The pulse to control the write operation is developed when, with a positive potential present on line 121–0, an output pulse is produced on the output terminal W4 of the write pulse generator. This causes a pulse to be transmitted through AND circuit 127–0 to write amplifier 128–0, causing this amplifier to produce a half select write pulse which, as is indicated in FIG. 6H, is manifested on output line 124–0.

Summarizing, the word memory column driver performs the following functions, all of which depend upon the realization of a comparison in the associated column of the tag memory during the operation being performed. The comparison steps are carried out during read, write, and erase operations. For example, if, during a read operation, a comparison is achieved on column 0 of the tag memory, a pulse is applied to line 105–0, which causes an output signal to be produced on line 123–0. This signal controls reading out of column 0 of the word memory. During the write operation, it is necessary to both reset the word memory and to write a new word of information in the column after resetting is accomplished. The presence of a pulse at terminal 121–0, as a result of the comparison step performed during the write operation, controls the AND circuit 125–0 and erase amplifier 126–0, to first produce a negative full reset pulse on output line 124–0 and subsequently, the AND circuit 127–0 and write amplifier 128–0 to produce a positive half select write pulse on this same output line. The pulse developed on lines 123–0 and 124–0 control reading, writing, and resetting of the word memory in the following manner.

*Word memory*.—The word memory consists of a plurality of magnetic cores of the same type which are used in the tag memory, the difference being that only one core per storage position is required in the word memory. For example, referring to the 0*a* position of the word memory, storage is effected in this position in the core 130–0*a*. The core is in its binary one state when in an unblocked condition and in a binary zero state when in a blocked condition. The core may be caused to assume the blocked condition by a full select negative pulse applied to line 124–0, which establishes a counterclockwise flux pattern to be established around aperture 92. When it is desired to write a binary one in the core, simultaneous half select pulses are applied to the column drive line for the core, here 124–0, and the row drive line 68*a* which is coupled to the word memory row driver for row "*a*" of the word memory as shown in FIG. 6G. Coincidently applied pulses on these drive lines cause the flux around the input aperture 92 to be switched to the clockwise direction and the core assumes its unblocked state. The core is sensed in response to the application of pulses to line 123–0 which, as described above, serves as one of the output lines for the word memory column driver. These pulses are produced by read amplifier 122–0 and this amplifier is similar to those employed in the tag memory driver in FIG. 6C. Thus, the signals produced on line 123–0 are in the form of successive positive and negative pulses. These pulses are effective to cause successive flux reversal in opposite directions around aperture 93 of core 130–0*a* when the core is in an unblocked state, thus, producing successive outputs on an output line 131*a* which links the apertures 93 of this core. When the core is in a blocked condition, the signals applied to line 123–0 do not produce any flux reversal around aperture 93 and no output signal is developed on output line 131*a*. As was the case with the cores of the tag memory, the sensing operation is non-destructive, since the flux around the output aperture 93 is always returned to its initial condition upon the completion of the sensing operation. The output line 131*a* for row "*a*" of the word memory extends through output apertures 93 for all of the cores in this row of the memory and is coupled to an output terminal 132*a* for this row. Each row of the word memory is similarly provided with a single output line. Since read operations are carried out on one column of the memory at a time, the output indicative of the binary value stored in each storage position in the addressed column is manifested on the appropriate one of the output terminals 132*a* through 132*n*, the presence of a signal at one of these row output terminals indicating the storage of a binary one in the corresponding position in the addressed column and the absence of an output signal indicating the storage of a binary zero in that position.

*Set up operation*.—The function steps performed during the set up operation are graphically illustrated in the block diagram of FIGS. 2A–2K. FIG. 2A shows the state of the counter C, stepping switch SS, tag memory TM, prior to the initiation of the set up operation. This operation is now described with reference to the structure shown in FIGS. 6A–6K. The operation is initiated by applying an input pulse to the terminal 10I of set up pulse generator 10. This generator is shown in FIG. 6A, as well as the pulses produced on the four output terminals S0, S1, S2, and S3 of the generator when a pulse is applied to the input terminal 10I. The first pulse produced is a pulse at the output terminal S0 and thereafter pulses are subsequently produced in the S1, S2, and S3 terminals. As explained above in the general description, the initial pulse developed in the S0 terminal conditions the system for the set up operation and each group of three successive pulses developed on the S1, S2, and S3 output terminals causes a vacancy tag to be assigned to one of the columns of the tag memory. Thus, eight groups of these pulses are required, after which the set up pulse generator is turned off by a pulse developed on line 80.

Referring now to the specific structure of FIGS. 6A through 6H, the initial pulse developed at output terminal S0 is applied in FIG. 6B to a terminal 20, which is connected to the reset line for the stepping switch SS, as explained above. The application of a pulse to this line causes the stepping switch SS to assume the condition shown in FIG. 2B, with a one stored in the last position of the stepping switch and the remainder of the positions being in their binary zero states. The pulse developed in the S0 output terminal is also applied, in FIG. 6E, to terminal 43 which is connected to the reset line for counter C and is effective, as explained above, to reset the counter to the condition shown in FIG. 2B. Finally, the S0 output pulse resets the flip flops 107–0 through 107–7 to their binary zero states so that these flip flops will be capable of functioning properly during subsequent comparison operations performed on the tag memory.

The first pulse developed in the S1 output terminal is employed to cause the counter C to be stepped up by one and the stepping switch SS to be advanced by one. This pulse is applied, in FIG. 6B, to terminal 22 which is connected to the advance line for the stepping switch. Since the output line 72–7 for position 7 of the stepping switch is connected back to the input line 73–0 for the position 0 of the stepping switch, the pulse applied to the advance line causes the one originally stored in position 7 to be transferred to position 0. The pulse developed on output terminal S1 is also applied to input terminal 44 for counter C in FIG. 6E. This terminal is coupled to the complement input of the flip flop FF–*c* which is the low order position for the counter. This pulse is effective to change this flip flop from its binary one to its binary zero state. At the same time, the S1 pulse is applied as a control pulse to AND circuits 46*a*, 46*b*, and 46*c*. Thus, when flip flop FF–*c* is changed from its one to its zero condition, a pulse is transmitted through differentiator 48*c* and AND circuit 46*c* to the complement input of flip flop FF–*b*, thereby changing this flip flop from its one to its zero state. This operation is repeated to change the state of each of the flip flops FF–*a* and FF–*f* from its one to its zero state. The propagation of the carry from flip flop to flip flop is sufficiently fast so that the carry is completed to the high order or "*f*" position during the time the S1 pulse is maintained. Thus, the first output pulse developed on the S1 output terminal causes the stepping switch SS and the counter C to assume the condition shown in FIG. 2C.

The next pulse available is developed on the output terminal S2 and this pulse effects the resetting of column 0 of the tag memory as is indicated in FIG. 2D. Referring to FIG. 6B, it can be seen that the S2 pulse is applied to the AND circuits 75–0 through 75–7. However, since only the 0 position of the stepping switch is now in a binary one state, a pulse is transmitted only through AND circuit 75–0 to terminal 81–0. The S2 pulse is also applied to AND circuits 82–0 through 82–7, so that the pulse developed at terminal 81–0 is passed through AND circuit 82–0 to amplifier 84–0 to cause a full select reset pulse to be produced at terminal 86–0. This pulse is applied to line 87–0 which is threaded through the input apertures 92 of all of the cores in column 0 of the tag memory. The full select pulse applied to this line is effective to cause the cores for each storage position to be set to their binary zero representing state, that is, the uppermost core of each pair, (e.g. 91–0), is set to its unblocked state and the lowermost core (e.g. 90–0), is set to its blocked state. Upon completion of the output pulse developed at the S2 terminal, the tag memory is in the condition shown in FIG. 2D. The tag memory is the only component effected by the S2 pulse.

The next pulse available is the pulse developed on the S3 output terminal. The function of this pulse is to transfer the value then stored in counter C to the selected column of the tag memory. This is accomplished in the following manner. The S3 pulse is applied to the AND circuit 75–0 in FIG. 6B and, since the zero position of the stepping switch SS is still storing a binary one, a pulse is again transmitted through this AND circuit to terminal 81–0. The S3 pulse is also applied to AND circuit 83–0 so that a pulse is transmitted from terminal 81–0 through this AND circuit to write amplifier 85–0 causing a positive half select pulse to be developed at terminal 86–0 and applied to the column drive line 87–0 for this column of the tag memory. At the same time as the above described operation is effected, S3 pulses are also applied to certain of the AND circuits in the tag memory row drivers of FIG. 6C. Referring to the driver TMRD–*a*, it can be seen that an S3 pulse is applied as a control pulse to AND circuit 53*a*. The input for this AND circuit is coupled to line 40*a* which is the binary one output line for the "*a*" position of counter C. Where, as here, this position is storing a binary zero (FIG. 2D), there is no pulse transmitted through AND circuit 53*a* to and through OR circuit 55*a* to write amplifier 59. Therefore, no pulse is transmitted to the row drive line 62*a* and the pair of cores in the 0*a* position of the tag memory remain unchanged in state and this position continues to store a binary zero. The S2 pulse is also applied to corresponding AND circuits for all of the other row drivers and specifically to the AND circuit 53*v* of the driver for the "*v*" row of the tag memory. The input for this AND circuit is coupled via line 40*v* to the binary one output of flip flop FF–*v* which is in a binary one state. Therefore, a pulse is transmitted through AND circuit 53*v* to and through OR circuit 55*v* to write amplifier 59*v* causing a half select pulse to be applied to the row drive line 62*v*. This pulse is applied coincidently with the pulses applied to the column drive line 87–0 so that the state of each of the cores 91–0*v* and 90–0*v* is changed and a binary one is stored in the 0*v* position of the tag memory. Since each of the "*b*" and "*c*" positions of the counter C is in its binary zero state at this time, the 0*b* and 0*c* (FIG. 1) positions of the tag memory TM remain in a binary zero condition. Upon termination of the S3 pulse the tag memory TM, counter C, and stepping switch SS are in the condition shown in FIG. 2E.

The next pulse available is the second pulse developed on the output terminal S1. This pulse is applied in FIG. 6B to terminal 22 to advance the one previously stored in the 0 position of the stepping switch to the 1 position of the stepping switch. The S1 pulse is also applied to terminal 44 of counter C and to the AND circuits 46*a*, 46*b*, and 46*c* of the counter so that the counter C is again stepped up by one. This second pulse developed on the S1 output terminal is effective to cause the counter C and stepping switch SS to assume the conditions shown in FIG. 2F. The next pulse available is the second pulse developed on the S2 output terminal. The operation here is similar to that described above for the first pulse developed on this terminal. This pulse, when applied to AND circuits 75–1 and 82–1 in FIG. 6B, with position 1 of the stepping switch now in a binary one state, causes a full select reset signal to be developed on line 87–1 to reset each pair of cores in column 1 of the tag memory to their binary zero state. The next S3 pulse performs a function similar to the first output pulse developed at this terminal. This pulse, as before, is applied to AND circuits 53*a* through 53*v* of the row drivers of FIG. 6C to cause pulses to be developed on the ones of the output lines 62*a* through 62*v* for the row drivers which have binary ones stored in the corresponding positions of the counter C. In this way, the vacancy tag 001–1 is written in the 1 column of the memory as indicated in FIG. 2H.

Six more groups of pulses are selectively developed on the S1, S2, and S3 output terminals to assign vacancy tags to the remaining six columns of the tag memory. The functional operations achieved by the last such group of pulses are shown in FIGS. 2I–2K. The S1 pulse advances the stepping switch SS and counter C by one; the S2 pulse causes the appropriate column, here column 7, of the tag memory to be reset; and the S3 pulse causes the value stored in counter C to be transferred into column 7 of the tag memory. During this last operation, a pulse is transmitted back to the set up pulse generator to shut this generator off. This pulse is transmitted from the terminal 77 (FIG. 6B) connected to the output line 74–7 of position 7 of the stepping switch. Terminal 77 is connected to the input of AND circuit 79 (FIG. 6A) which receives control input pulses from the S3 output terminal. Thus, during this last step of the set up operation, which is the only time during the set up operation that the position of this stepping switch is in the binary one condition at a time when a pulse is developed on the S3 output terminal, a pulse is passed through AND circuit 79 and thence via line 80 to the set up pulse generator 10 to shut off this pulse generator, upon completion of the S3 pulse then being produced.

*Write operation.*—The functional steps performed during the write operation are illustrated in FIGS. 3A, 3B, and 3C. The manner in which these steps are performed is now described with reference to the structure of the system, as shown in FIGS. 6A through 6H. The operation will be considered after the tag and words to be written in the memory have been entered in the tag register TR and word register WR, respectively. The first step in the write operation is to locate the column in the memory in which the writing is to take place. This is done by comparing the vacancy tag then present in counter C with the tag present in the various columns of the tag memory. Next, the column, which is selected as a result of this comparison step, is completely reset both in the tag memory and word memory. Finally, the tag in the tag register and the word in the word register are simultaneously written in the selected column of the memory, and the counter C is stepped down by one.

The write operation is initiated by a pulse applied to the input terminal 16I of the write pulse generator 16 which is shown in FIG. 6A. When the write pulse generator is actuated by an input pulse applied to this terminal, output pulses are produced at the output terminals W1 through W5 in the manner indicated adjacent these output terminals in FIG. 6A. The first pulse produced is the pulse produced at output terminal W1 and the next pulse produced, which is overlapped by the output pulse produced at W1, is the output pulse produced at terminal W2. These two pulses control the comparison of the vacancy tag then stored in the counter C with the tags stored in the various columns of the tag memory. Referring to the tag memory row drivers of FIG. 6C, the WI pulse is applied to the AND circuits 51*a* through 51*v* and the W2 pulse is applied to the INVERTER circuits 56*a* through 56*v*. Considering the operation of the driver for the "*a*" row of the memory as exemplary, the input for AND circuit 51*a* is connected via line 40*a* to the binary one output for the "*a*" position of counter C. Since this position of the counter is now storing a binary one (FIG. 3A), a pulse is transmitted through AND circuit 51*a*, OR circuit 54*a* to read "1" amplifier 57*a*, causing a signal in the form of successive plus and minus pulses to be produced on output line 60*a* which is threaded through the output apertures for each of the upper cores (e.g. 91–0)

in row "*a*" of the tag memory. The upper core for each of these storage positions which is storing a binary one is in a blocked state and, for each position which is storing a binary zero, the upper core is in an unblocked state. An output signal is produced on each of the output lines 97–0 through 97–7 associated with a column which has a binary zero stored in its uppermost or "*a*" position. At the same time, a similar operation is performed by the other drivers of FIG. 6C. Since only the tag stored in column 7 of the tag memory compares exactly with the vacancy tag then present in the counter C, an output is produced on at least one core in each of the columns and these outputs are transmitted via the lines 97–0 through 97–6, (not shown) as inputs to the coupling units CU–0 through CU–6 (not shown in FIG. 6F). Considering coupling unit CU–0, which receives pulses from line 97–0, the positive portion of the output signal is transmitted through clipping circuit 100–0, as a control input to INVERTER circuit 101–0. While this control input is being applied to this INVERTER circuit, the output pulse developed on the output terminal W2 of the write pulse generator is applied as an input to the INVERTER. However, the signal at the control input of this INVERTER prevents outputs from being developed on output line 102-0. At the same time the W2 output pulse is applied to the remaining ones of the INVERTERS 101–0 through 101–7. However, since there is a complete comparison output line 97–7 and no pulse is applied as a control input to INVERTER 101–7. Therefore, the W2 output pulse applied to this INVERTER causes an output pulse to be produced on output line 102–7. This pulse is applied as an input to AND circuit 106–7. This AND circuit receives control pulses from the W1 output terminal of the write pulse generator which pulses, as stated above, overlap the pulses produced on the W2 output terminal of this generator. Therefore, a pulse is produced on the output of AND circuit 106–7, which pulse is applied to the delay flip flop 107–7 and causes this flip flop to assume its binary one condition to indicate that a comparison has been achieved in column 7 of the tag memory. With flip flop 107–7 in its binary one condition, the positive potential of the binary one output of this flip flop is transmitted via line 110–7 back up to the terminal 81–7 in FIG. 6B. The next output pulse available is that developed on the W3 output terminal. This pulse is applied as a control input to the AND circuit 82–7 and, since terminal 81-7 is at this time positive, a pulse is passed through this AND circuit to erase amplifier 84–7 causing a full select erase pulse to be produced at terminal 86–7 and applied to column drive line 87–1. This pulse resets all of the positions in column 7 of the tag memory to their binary zero state in the manner described above. At the same time, the W3 pulse is also applied as a control input to the AND circuit 125–7 of the word memory column driver WMCD–7 shown in FIG. 6H. With the flip flop 107–7 in its binary one state, the positive potential at the binary one output for this flip flop (FIG. 6F) is transmitted via terminal 109–7 and line 120–7 as an input to AND circuit 125–7. Thus, upon application of the output pulse developed on the W3 output terminal, a pulse is transmitted through this AND circuit to erase amplifier 126–7, causing a full select reset pulse to be applied to the column drive line 124–7 for column 7 of the word memory. This pulse resets each of the cores in this column to the binary zero state. The condition of the system upon completion of the W3 output pulse is indicated in FIG. 3B, it being noted, as before, that though the word memory is not shown in this figure, column 7 thereof is also reset completely to zero during the write operation depicted.

The next output pulse is developed at output terminal W4 and this pulse is effective to subtract one from the counter C to cause the value stored in the tag register to be transferred into column 7 of the tag memory, and to cause the value stored in the word register to be simultaneously transferred into column 7 of the word memory. The W4 output pulse as applied to the input terminal 44 of the counter C. At the same time, this pulse is applied as a control input to AND circuits **45*a*, 45*b*, and 45*c*, to condition the counter for the subtraction operation. The pulse applied at terminal 44** changes the flip flop FF–*c* from its binary one to its binary zero condition. Since, in accordance with the rules of binary subtraction, this operation does not require a borrow from the next higher order, no pulse is transmitted through differentiator **47*c*** to the complement input of flip flop FF–*b*.

The W4 pulse is also applied to the AND circuits **52*a* through 52*v* of the tag memory row drivers of FIG. 6C. The inputs of these AND circuits are coupled to the outputs of the corresponding positions of the tag register TR. As a result, for each position of the tag register which is storing a binary one, a pulse is produced on the appropriate output line 62*a* through 62*v*** by the associated row driver. For example, the "*a*" position of the tag register, as shown in FIG. 3A, is at this time storing a binary one. Therefore, upon application of the W4 pulse, a pulse is transmitted through AND circuit **52*a* and OR circuit 55*a* to write amplifier 59*a* causing a positive half select pulse to be developed on line 62*a***, which serves as the row drive line for the "*a*" row of the tag memory. The W4 pulse is also applied as a control pulse to the AND circuits 83–0 through 83–7 of the tag memory column drivers shown in FIG. 6B. As a result of the previous operation on which a comparison was achieved on column 7, the delay flip flop 107–7 shown in FIG. 6F is in a binary one condition and, therefore, the potential at terminal 81–7 in FIG. 6B remains positive. Thus, upon application of the W4 pulse, a signal is transmitted from AND circuit 83–7 to write amplifier 85–7, causing a positive half select pulse to be applied to column drive line 87–7. This pulse is applied to each of the cores in this column of the tag memory. Simultaneously, as explained above, pulses representative of binary ones are applied to appropriate ones of the row drive lines **62*a* through 62*v*, so that the value stored in the tag register is transferred to the column 7** of the tag memory.

The W4 pulse is also applied to the AND circuits **66*a* through 66*n* in the word memory row drivers shown in FIG. 6G. The inputs for these AND circuits are connected to corresponding positions of the word register so that for each position of the word register which is storing a one, a pulse is transmitted to a corresponding one of the write amplifiers 67*a* through 67*n* causing a half select pulse to be developed on the corresponding one of the row drive lines 68*a* through 68*n* for the word memory. At the same time the W4 pulse is also applied to the AND circuits 127–0 through 127–7 of the column drivers for the word memory shown in FIG. 6H. The potential on the input line 120–7 for the driver for column 7 remains positive, due to the fact that the flip-flop 107–7 (FIG. 6F) was set to a binary one state as a result of a comparison step previously carried out to locate the column in which the write operation was to be performed. Therefore, when the W4 pulse is applied to AND circuit 127–7, a signal is applied to write amplifier 128–7, causing a half select pulse to be applied via column drive line 124–7 to all of the cores in column 7 of the word memory. This pulse is applied simultaneously with the binary one representing pulses applied to the row drive lines 63*a* through 63*n* so that the word stored in the word register WR is written in column 7** of the word memory.

The last one of the pulses developed by write pulse generator 16 is produced at W5 output terminal, and this pulse is applied to the binary zero inputs of the flip flops 107–0 through 107–7 of the coupling units shown in FIG. 6F. This pulse resets the flip flop 107–0 in column 7 to its binary zero condition so that the system is now in condition to perform another operation.

*Erase operation.*—The erase operation is initiated by applying a pulse to the input terminal 14I for the erase pulse generator 14 as shown in FIG. 6A. This input pulse causes output pulses in the sequence shown to be developed on the output terminals E1 through E5 for this generator. The functions performed during an erase operation are depicted in FIGS. 4A, 4B, and 4C. After the identifying tag, which is to control the erase operation, is entered in the tag register TR, this identifying tag is compared wih the tags stored in the tag memory TM to locate the column in the memory on which the erase operation is to be performed. In FIG. 4A, this column is indicated to be column 3. The next step in the operation is to erase the value stored in this column of the tag memory by resetting all of the storage positions in this column to their binary zero state. At the same time, a one is added to the value in the counter C. After the value stored in the selected column of the tag memory has been erased, the just increased value stored in counter C is transferred to that column of the tag register. Referring to FIGS. 6A through 6H, the manner in which pulses developed on the output terminals E1 through E5 control the system to perform the above enumerated steps is now explained.

The output pulses developed on the E1 and E2 output terminals of the erase pulse generator are applied as control inputs to the AND circuits **50*a* through 50*v* and the INVERTER circuits 56*a* through 56*v*, respectively, of the tag memory row drivers shown in FIG. 6C. The operation in response to these pulses is similar to that described above with reference to the application of the W1 and W2 pulses developed on the corresponding output terminals of the write pulse generator. E1 and E2 erase pulses cause the value stored in the tag register TR to be compared with the value stored in the eight columns of the tag memory TM by producing signals on one of each pair of lines 60*a*, 61*a* through 60*v*, 61*v*, in accordance with the values stored in the various positions of the tag register. The fact of a comparison is indicated by the absence of an output on one of the output lines 97–0 through 97–7 (FIG. 6D) of the tag memory and this manifestation is employed by the associated coupling units under control of the proper one of the INVERTERS 101–0 to 101–7 to allow the E2 pulses applied to that INVERTER to produce a signal at the corresponding one of the terminals 103–0 to 103–7. This pulse sets the associated one of the delay flip flop 107–0 through 107–7 in the same manner as during the selection of the proper column for writing in the operation described above. The E2 output pulse is also applied to the input terminal 44 of the counter C and to the control terminals of the AND circuits 46*a*, 46*b*, and 46*c* in the circuitry connecting the counter stages one to the other. This conditions the counter for an addition operation and, therefore, the value stored in the counter is increased by one in response to the E2 pulse applied to terminal 44**.

If we consider the erase operation depicted in FIG. 5A, the column selected for the erase operation by a comparison step is column 0 of the memory. Thus, delay flip flop 107–0 shown in FIG. 6F is set to its binary one state which causes a positive potential to be transmitted both to the input terminal 121–0 (FIG. 6H) of the column driver for that column of the word memory and also to the terminal 81–0 shown in FIG. 6B. Since the AND circuits 125–0 and 127–0 of the column driver of FIG. 6H do not receive control pulses during an erase operation, the presence of the positive potential at 121–0 has no effect on the word memory. However, the presence of the positive potential at terminal 81–0 in FIG. 6B causes column 0 of the memory to be reset when the E3 output pulse is applied to the control input of AND circuit 82–0. Subseqeuntly, when the output pulse is developed on the E4 output terminal, the AND circuit 83–0 produces an output which causes a half select pulse to be applied to the column drive line 87–0 for column 0 of the tag memory. At the same time the E4 output pulse is applied to the AND circuits **53*a* through 53*v* of the tag memory drivers of FIG. 6C so that there are produced on the half select output lines 62*a* through 62*v*, outputs which are representative of the vacancy tag then stored in counter C. The pulses developed on lines 62*a* to 62*v* are applied simultaneously with the pulse developed on column drive line 87–0 and together these pulses cause the vacancy tag then present in the counter C to be written in the column 0** of the tag memory.

The final step in the erase operation is in response to the output pulse developed at output terminal E5 which pulse, as is indicated in FIG. 6F, is applied to the binary zero input of each of the flip flops 107–0 through 107–7. This pulse resets the one of these flip flops which was previously set to its binary one state to thereby condition the system to perform subsequent read, write, and erase operations.

*Read operation*.—The read operation is initiated by applying pulses to the input terminal 12I of read pulse generator 12 shown in FIG. 6A, after the identifying tag which is to control the reading has been entered in the tag register TR. The application of a pulse to terminal 12I causes pulses to be developed in the sequence shown on the output terminals R1 and R2. During a read operation the value of the identifying tag in the tag register is compared with the tags stored in the tag memory. On the column on which a comparison is achieved a signal is developed to cause the word stored in the associated column of the word memory to be read out. The comparison step is performed in a manner similar to the comparison step of the erase operation, differing only in that the AND circuits **50*a* to 50*v* are now controlled in response to an R1 output pulse instead of an E1 output pulse and the INVERTER circuits 56*a* through 56*v* are controlled in response to an R2 output pulse instead of an E2 output pulse. In this way, signals are developed on one of each pair of output lines 60*a*, 61*a* through 60*v*, 61*v* in accordance with the values stored in the tag register. The pulses on these lines cause output signals to be produced on the output lines 97–0 and 97–7 (FIGS. 6D and 6F) for each column except the one which is storing the tag which compares with the identifying tag stored in the tag register. Consider the case where a comparison is achieved on column 0 of the tag memory and, therefore, no output pulse is produced on output line 97–0. With no pulse present on this line, the R2 pulse applied to the INVERTER 101–0 of FIG. 6F causes a pulse to be produced at terminal 103–0 which is passed through AND circuit 104–0 under the control of the R1 pulse which is applied as a control input to this AND circuit. The output of AND circuit 104–0 is transmitted via line 105–0 to read amplifier 122–0 (FIG. 6H). The read amplifier 122–0 produces a signal on line 123–0 in the form of successive positive and negative pulses. Line 123–0 threads the output apertures of each of the cores for column 0 of the word memory causing to be produced on the output lines 131*a* through 131*n* outputs representative of the word stored in this column of the word memory. Since positive and negative pulses are successively applied to line 123–0, the operation is nondestructive and all of the cores in column 0** are returned to their original binary information representing state at the end of the read operation.

Though the system described herein is illustrative of the manner in which the principles of applicant's invention are used in a particular application it is, of course, obvious that many extensions and changes in the system disclosed might be made, and that systems built in accordance with the same principles for different applications might be fabricated. Thus, it is not necessary that the number of storage positions in the rows and columns of the tag memory be just sufficient to store all of the possible tags, and that there be the same number of possible values of identifying tags as vacancy tags. For example, the tag memory might be constructed to include eight columns as shown, but with a much larger number of rows. In such a case, the same number of vacancy tags are used with zeros filling the higher order positions in the added row but the range of possible identifying tags is expanded. Similarly, the entire memory system might be expanded either by increasing the number of rows and/or columns in one or both of the word and tag memories in accordance with the type of information which is to be processed.

While the invention has been particularly shown and described with reference to preferred embodiments thereof, it will be understood by those skilled in the art that various changes in form and details may be made therein without departing from the spirit and scope of the invention.

What is claimed is:

1. In a memory system; a tag memory for storing a plurality of identifying tags and vacancy tags; a tag register for storing an identifying tag; a counter for storing a vacancy tag; means coupled to said tag register, counter, and tag memory for causing the tags stored in said tag memory to be compared with at least one of said tags stored in said tag register and said counter; and means responsive to said comparison operation for causing at least one of said tags stored in said tag register and said counter to be transferred into said tag memory.

2. In a memory system; a memory including a plurality of groups of storage devices; each group capable of storing a word of information; a counter; means for resetting said counter; means responsive to said resetting means for repeatedly transferring the value of said counter to a different one of said groups of storage devices in said memory and for increasing the value in said counter between transfers; and means for comparing the value in said counter with the values transferred from said counter into said groups of storage devices to select a group of storage devices in which each new word of information is to be written in said memory and for decreasing the value in said counter after each such operation.

3. In a memory system; a memory for storing a plurality of identifying tags and vacancy tags; a tag register for storing an identifying tag; a counter for storing a vacancy tag; means for selecting functional operations to be performed in the memory system; means, coupling said counter and said tag register to said memory and responsive to said selection means, for causing the tag stored in either said counter or said tag register to be entered in said memory during predetermined functional operations and to be compared with tags previously entered in said memory during predetermined functional operations; and means responsive to said selection means for applying signals to said counter to increase or decrease the value of the vacancy tag stored therein.

4. The system of claim 3 wherein each of said identifying tags and vacancy tags is a multi-order tag and the value of an order in each vacancy tag is the same and is different than the value of the same order in each identifying tag.

5. In a memory system; a memory including a plurality of groups of storage devices; each group capable of storing a word of information including an identifying tag for the word; a counter; means for resetting said counter; means responsive to said resetting means for repeatedly transferring the value in said counter as a vacancy tag to a different one of said groups of storage devices in said memory and for increasing the value in said counter between transfers; register means for receiving words of information including an identifying tag for the words; means operable to cause each word of information including its identifying tag to be transferred from said register means to a selected group of storage devices in said memory under control of the vacancy tag stored in said counter and the vacancy tags transferred from said counter into said groups of storage devices; and means for decreasing the value in said counter each time a tag is transferred from said tag register into a group of storage devices in said memory.

6. In a memory system; a memory including a plurality of groups of storage devices, each group capable of storing a word of information; means for selecting functional operations to be performed in the memory system; a first register for storing a tag having a predetermined value in a predetermined portion; a second register for storing a tag having a different predetermined value in a portion corresponding to the predetermined portion of the tag stored in the first register; and means responsive to the selection means and coupled to said memory, said first register, and said second register, for selectively causing a tag stored in one of said registers to be entered in one of said groups of storage devices in said memory during predetermined functional operations and to be compared with tags previously entered in said memory during predetermined functional operations.

7. The device of claim 6 wherein said first register is a counter and the tag stored in said counter is decreased each time a tag stored in said second register is entered in said memory.

8. In a memory system; a tag memory for storing a plurality of identifying tags and vacancy tags; a tag register for storing an identifying tag, a counter for storing a vacancy tag; and means coupled to said tag register, counter, and tag memory for controlling read, write, and erase operations in said memory system by effecting simultaneous comparisons between all the tags stored in said tag memory and at least one of said tags stored in said counter and said tag register; and means responsive to the controlling means for increasing the value of said vacancy tag stored in said counter during predetermined operations and decreasing the value of said vacancy tag stored in said counter during other predetermined operations.

9. In a memory system; a memory for storing a plurality of information words; means for initiating predetermined functional operations of the memory system; and means for keeping track of empty locations in the memory and for controlling the writing of information words in empty locations in said memory, said last-mentioned means comprising counting means, means for changing a value stored in said counting means, and means responsive to the initiating means for transferring a value stored in said counting means into a selected portion of said memory during predetermined functional operations and for comparing a value stored in said counting means with values stored in said memory during predetermined functional operations.

10. In a memory system; a memory including a plurality of word storage locations; operation control means for selectively writing words in said word storage locations and erasing words previously written in said word storage locations; a counter; means for setting said counter at a value representative of the number of empty word storage locations in said memory; and means responsive to said operation control means for decreasing the value stored in said counter each time a word is written in one of said empty word storage locations and for increasing the value stored in said counter each time a word stored in one of said locations in said memory is erased from said memory.

11. In a memory system; a memory including a plurality of word storage locations; operation control means for selectively writing words in said word storage locations and erasing words previously written in said word storage locations; a counter; means responsive to the operation control means for setting said counter at a value representative of the number of empty word storage locations in said memory and thereafter decreasing the value stored in said counter each time a word is written in one of said empty word storage locations and increasing the value stored in said counter each time a word stored in one of said word storage locations in said memory is erased from said memory; and counter control means, responsive to said operation control means and coupled to said counter and said memory, for comparing the value then stored in said counter to be compared with the values previously transferred from said counter to said memory to thereby locate an empty storage location in said memory when a word is to be written in said memory, and for transferring the increased value from said counter to the word storage location from which the word is erased when a word is to be erased.

12. A memory including a plurality of groups of storage devices; means for initiating functional operations to read, write, and erase information in said memory; a counter capable of storing any one of a number of different values and having the values stored therein either increased or decreased in response to signals applied thereto; means responsive to the initiating means effective during predetermined functional operations for applying to said counter signals to change the value stored in said counter in accordance with the type of operation being performed; and means responsive to said initiating means for transferring the value stored in said counter into said memory during predetermined functional operations and for comparing the value in said counter with values previously stored in said memory during predetermined functional operations.

13. In a memory system; a memory; a counter capable of storing a value and having the value stored therein changed in response to signals applied thereto; means for controlling functional operations to read, write, and erase information in said memory; means responsive to the controlling means for applying signals to said counter during predetermined operations to change the value in said counter according to the operation performed; and means, responsive to the controlling means and coupling said counter and said memory, for transferring values in said counter into said memory during predetermined functional operations and for comparing values in said counter with the values stored in said memory during predetermined functional operations.

14. In a memory system; a tag memory; a word memory, a tag register for storing an identifying tag; a word register for storing an information word; a counter for developing vacancy tags; means for selecting functional operations to be performed in the memory system; first means coupling said word register to said word memory; second means coupling said tag register and said counter to said tag memory; means responsive to the selection means for controlling said first coupling means to transfer an information word in said word register into said word memory, and for controlling said second coupling means to cause at least one of said tags in said tag register and said counter to be entered in said tag memory during predetermined functional operations and to be compared with tags previously entered in said tag memory during predetermined operations; and means responsive to said selection means for applying signals to said counter to change the value of the vacancy tag therein.

15. In a memory system of the type including a plurality of word storage locations each capable of storing an information word and an identifying tag for the information word and which is addressed by comparing an identifying tag with tags stored in said memory; means for selecting functional operations to be performed in the memory system; a counter; means responsive to said selection means for selectively increasing or decreasing the value in said counter in accordance with the selected functional operations; and means, coupling said counter to said memory and responsive to the selection means, for transferring the value in the counter to a word storage location in said memory during predetermined functional operations and for comparing the value in the counter with values stored in said memory during predetermined functional operations; whereby said counter is effective to assign vacancy tags to selected word storage locations in said memory to designate each such location as being empty and to thereafter locate such locations when a new word of information is to be written in said memory.

16. In a memory system of the type including a plurality of word storage locations each capable of storing an information word and an identifying tag for the information word and which is addressed for functional operations by comparing an identifying tag with tags stored in said memory system: means for initiating set up, write, and erase operations in said memory system; a counter; means responsive to the initiating means for changing the value in said counter; and means, responsive to said initiating means and coupling said counter to said memory system, for transferring the value in the counter to a word storage location in said memory during predetermined operations and for comparing the value in the counter with values stored in said memory system; during predetermined operations; and control means responsive to the initiating means where, during a set up operation, the control means resets said counter, repeatedly transfers the value in said counter as a vacancy tag to a different one of said word storage locations, and increases the value in said counter between transfers, where, during a write operation, the control means compares the vacancy tag in the tag register with the tags stored in said memory system to locate a word storage location in which the write operation is performed and effective after the location is selected to decrease the value in said counter, and where, during an erase operation, the control means increases the value in said counter and transfers the increased value in said counter to the word storage location on which the erase operation is performed.

17. In a memory system; a memory for storing a plurality of tags; means for selecting functional operations to be performed in the memory system, a first register for storing a tag; a second register for storing a tag; means responsive to the selection means and coupled to said memory, said first register and said second register, for causing the tag stored in one of said registers to be entered in said tag memory during predetermined functional operations, and to be compared with tags previously entered in said tag memory during predetermined functional operations; whereby, when a tag stored in one of said registers is compared with tags previously entered in said memory, a comparison can be realized only on a tag previously entered from that register.

18. In a memory system; a memory for storing data words; a counter capable of storing a value and having the value stored therein increased or decreased in response to signals applied thereto; means for controlling functional operations to read, write, and erase information in said memory; and means responsive to said controlling means for applying signals to said counter during predetermined operations to change the value in said counter according to the operation performed to cause the value in said counter to be continuously indicative of the number of data words that are stored in said memory.

References Cited by the Examiner

UNITED STATES PATENTS

| | | | |
|---|---|---|---|
| 2,587,532 | 2/52 | Schmidt | 340—172.5 |
| 2,800,277 | 7/57 | Williams et al. | 340—172.5 X |
| 2,815,168 | 12/57 | Zukin | 340—172.5 X |
| 2,847,657 | 8/58 | Hartley | 340—172.5 |
| 2,850,566 | 9/58 | Nelson | 340—172.5 X |
| 2,885,659 | 5/59 | Speilberg | 340—172.5 |
| 2,895,124 | 7/59 | Harris | 340—172.5 |
| 2,907,004 | 9/59 | Li Chien et al. | 340—172.5 X |
| 2,913,706 | 11/59 | Thorensen et al. | 340—172.5 |
| 2,994,065 | 7/61 | Thomas et al. | 340—172.5 |
| 3,018,959 | 1/62 | Thomas | 340—172.5 |

MALCOLM A. MORRISON, *Primary Examiner.*
EVERETT R. REYNOLDS, NEIL C. READ, *Examiners.*